(12) United States Patent
Sinharoy

(10) Patent No.: US 6,449,714 B1
(45) Date of Patent: Sep. 10, 2002

(54) TOTAL FLEXIBILITY OF PREDICTED FETCHING OF MULTIPLE SECTORS FROM AN ALIGNED INSTRUCTION CACHE FOR INSTRUCTION EXECUTION

(75) Inventor: Balaram Sinharoy, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/375,839

(22) Filed: Aug. 16, 1999

Related U.S. Application Data

(63) Continuation-in-part of application No. 09/235,474, filed on Jan. 22, 1999, now Pat. No. 6,247,097.

(51) Int. Cl.[7] .............................. G06F 9/38; G06F 9/40
(52) U.S. Cl. ...................... 712/240; 712/234; 712/236; 712/237; 712/238; 712/239; 711/125; 711/131; 711/137; 711/213
(58) Field of Search ................................ 711/129, 131, 711/137, 213; 712/234, 236, 237, 238, 239, 240

(56) References Cited

U.S. PATENT DOCUMENTS 5,136,697 A * 8/1992 Johnson ...................... 712/239
5,669,001 A    9/1997 Moreno (List continued on next page.)

OTHER PUBLICATIONS

Yeh et al., "Increasing the Instruction Fetch Rate via Multiple Branch Prediction and a Branch Address Cache", *Proceedings of the 7th ACM International Conference on SuperComputing*, Jul. 1993.*

Smith, "A Study of Branch Prediction Strategies", 8th Annual International Symposium on Computer Architecture, ACM, 1993.*

(List continued on next page.)

*Primary Examiner*—William M. Treat
(74) *Attorney, Agent, or Firm*—Lynn L. Augspurger; Marc A. Ehrlich

(57) ABSTRACT

Each of plural rows in an aligned Instruction cache (AIC) contains a plurality of aligned sectors, each sector having space for a block of sequentially-addressed instructions in an executing program. A "fetch history table" (FHT) contains FHT sets of FHT entries for specifying execution sequences of the sectors in associated AIC rows. Each FHT entry in a FHT set specifies an AIC row and a sector sequence arrangement to be outputted from that row. In this manner, each FHT entry can associate itself with any row in the AIC and is capable of specifying any output order among the sectors in its associated row. Unique fields are selected in each instruction address for locating an associated FHT set, and for associating the instruction address with an AIC sector through a unique "sector distribution table" (SDT) to locate the sector which starts with the instruction having this instruction address. A program is executed using "FHT cycles", in which each FHT cycle uses a predicted instruction address and a prediction vector, both being matched with the FHT entries in the located FHT set. A FHT hit occurs if a match is found for a valid FHT entry. A hit FHT entry is used to control outgating for execution of a plurality of AIC sectors in the associated AIC row without branch instruction overhead. A FHT miss occurs when no hit FHT entry is found in a FHT cycle, and a new FHT entry is generated during the FHT cycle using conventional branch instruction execution until the new FHT entry is completed. During the FHT entry generation process, the SDT is Pused to locate AIC sectors to be specified in the sector sequence for the current FHT entry being generated during a FHT miss cycle.

20 Claims, 11 Drawing Sheets

U.S. PATENT DOCUMENTS

| | | | |
|---|---|---|---|
| 5,699,536 A | | 12/1997 | Hopkins et al. |
| 6,112,299 A | * | 8/2000 | Ebcioglu et al. ............. 712/236 |
| 6,247,097 B1 | * | 6/2001 | Sinharoy .................... 711/125 |
| 6,272,624 B1 | * | 8/2001 | Giacalone et al. .......... 712/239 |
| 6,332,191 B1 | * | 12/2001 | Witt ........................... 712/240 |

OTHER PUBLICATIONS

Yeh et al., "A Comparison of Dynamic Branch Predictors that use Two Levels of Branch History", 20th Annual International Symposium of Computer Architecture, ACM, 1993.*

Ball et al., "Branch Prediction for Free", 1993 SIGPLAN Conference on Programming Languages Design and Implementation, ACM, Jun. 1993.*

Rotenberg et al., "Trace Cache: A Low Latency Approach to High Bandwidth Fetching", pp. 1–48, Apr. 11, 1996.*

Conte et al., "Optimization of Instruction Fetch Mechanisms for High Issue Rates," *Proceedings of the 22nd Annual International Symposium on Computer Architecture*, (Santa Margherita, Italy), Jun. 1995.*

Black et al., "The Block–Based Trace Cache", *Proceedings of the 26th International Symposium on Computer Architecture*, 1999, IEEE, pp. 196–207, May 2–4, 1999.*

Rotenberg et al., "A Trace Cache Microarchitecture and Evaluation", *IEEE Transactions on Computers*, pp. 111–120, Feb. 1999.*

Friendly et al., "Alternative Fetch and Issue Policies for the Trace Cache Fetch Mechanism", *Proceedings of the Thirtieth Annual IEEE/ACM International Symposium on Microarchitecture*, 1997, pp. 24–33, Dec. 1–3, 1997.*

Jacobsen et al., "Path–Based Next Trace Prediction", *Proceedings of the Thirtieth Annual IEEE/ACM International Symposium on Microarchitecture*, 1997, pp. 14–23, Dec. 1–3, 1997.*

* cited by examiner

IFAR ADDRESSES V, L, M, G AND U MAP TO AIC ROWS c, b, a AND b RESPECTIVELY.

TOTAL FLEXIBILITY OF PREDICTED FETCHING OF MULTIPLE SECTORS FROM AN ALIGNED INSTRUCTION CACHE FOR INSTRUCTION EXECUTION

INCORPORATION BY REFERENCE

The entire specification of prior filed application Ser. No. 09/235,474 filed on Jan. 22, 1999, now U.S. Pat. No. 6,247,097 entitled "Aligned Instruction Cache Handling of Instruction Fetches Across Multiple Predicted Branch Instructions" by the same inventor as the subject application is herein incorporated by reference.

CONTINUATION-IN-PART

This specification is a continuation-in-part of previously filed U.S. application Ser. No. 09/235,474 which is incorporated by reference. The filing date of application Ser. No. 09/235,474 is claimed for all matter in the subject application in common with, application Ser. No. 09/235,474.

This invention deals with a novel process and novel electronic circuits in a processor for significantly reducing the execution time of programs without increasing processor instruction execution rate. A fetch history table (FHT) stores recent branch history of program execution and is used by a processor to direct the path of future execution of the program. The invention enables any valid FHT entry to control the outgating for execution in any sequence or instructions in aligned sectors in an associated row of an instruction cache (AIC) without the conventional branch instruction overhead. This invention utilizes a novel "sector distribution table" (SDT) for quickly locating a next-to-be executed aligned segment of instructions in the associated AIC row for outgating to the processor's execution pipeline under control of novel FHT entries in novel types of FHT sets. The inventive process enables all FHT entries to have complete flexibility in specifying any sequence of the valid sectors in the associated AIC row.

PRIOR ART

The prior art is the same as cited in the incorporated specification Ser. No. 09/235,474.

CHARACTERISTICS OF THE INCORPORATED SPECIFICATION

The incorporated specification discloses novel circuits and novel processes for using the novel circuits. The novel circuits and processes include and use a fetch history table (FHT) containing novel FHT entries grouped into novel FHT sets for controlling the processor execution of instructions stored in aligned sectors of an Aligned Instruction Cache (AIC). Each row in the AIC includes a plurality of aligned sectors, each storing all, or a part of, a basic block of instructions ending in a branch instruction. Each valid FHT entry specifies a previously-executed sequence of sectors stored in an AIC row associated with the FHT set. The novel form of each valid FHT entry allows the FHT entry to be selected by a prediction vector during an FHT cycle, and to be used to control future re-execution of its represented sequence to avoid conventional branch instruction overhead and time loss previously occurring in the processor execution of branch instructions.

The incorporated specification provides "AIC cycles". Each "AIC cycle" starts with a determination of an AIC hit or miss, and FHT entries are not allowed to control program execution during those AIC cycle which have an AIC miss.

If an "AIC cycle" starts with an AIC miss, a FHT entry is generated during the "AIC cycle" using conventional branch instruction execution. On the other hand, the subject invention provides novel "FHT cycles" and does not use "AIC cycles". Each "FHT cycle" having a FHT hit is used to control program execution, even when an AIC miss occurs within the "FHT cycle".

An AIC miss occurs when no row in the AIC begins with an instruction currently predicted to be executed by the program. Then, one or more variable-length basic blocks of instructions are fetched from the storage hierarchy of the computer system, and all or part of the fetched basic block(s) are stored into fixed-size aligned sectors in the AIC row associated with the currently predicted instruction. The associated AIC row is selected by hashing the address of the currently predicted instruction to generate an AIC index which locates the associated AIC row in the AIC. The fetched blocks are stored in execution order in the left-to-right sequence of the aligned sectors in the associated AIC row. Since all aligned sectors in the AIC have the same size, any sector may store an entire basic block if the block size does not exceed the storage space in the sector. If a basic block exceeding the size of a sector will fill the sector and its remaining part is stored into the next one or more sectors in the same AIC. When a fetched block overflows the remaining sector(s) in the associated AIC row, the block overflow may be stored into one or more sectors in another AIC row selected by hashing the address of the first instruction to be stored in the first sector overflowing into that AIC row. The branch instruction ending the basic block is stored in the last sector of the block, and the sectors storing any prior part(s) of the block do not contain any branch instruction. Thus at any time, any AIC sector may store a branch instruction ending a basic block, and at any other time the same AIC sector may not be storing any branch instruction.

The incorporated specification groups the FHT entries into FHT sets, and each FHT set is associated with a respective AIC row by being located in the FHT at an FHT index directly calculated from the AIC index. Each of the valid FHT entries in any FHT set specifies a different execution sequences of the sectors in the associated AIC row. However in the incorporated specification, each valid FHT entry in each FHT set specifies an execution sequence starting with the first (leftmost) sector in the associated AIC row (which is not done in the subject specification.).

FHT cycles are used by the inventive process to control program execution. Each FHT cycle has either a FHT hit on a valid FHT entry in the associated FHT set, or an FHT miss when no valid FHT entry is found in the associated FHT set. A FHT hit uses the FHT entry having the hit to control outgating to the processor execution pipeline of a sequence of aligned sectors in the associated AIC row, and the outgated sequence may have any sector order as long as the first sector of the sequence is the first sector in the associated AIC row. A FHT miss does not find any FHT entry in the associated FHT set, and temporarily reverts to conventional branch instruction processing for the program during which a FHT entry is generated to represent the instruction sequence using conventional branch instruction processing. An AIC miss causes a FHT miss, but an AIC hit may not prevent a FHT miss.

Each FHT cycle starts with a prediction operation using a "next instruction address" provided during the immediate prior FHT cycle either: in a hit FHT entry, or in a generated FHT entry provided in response to a FHT miss. The first FHT cycle for a program uses the program's entry instruction address. The prediction operation uses the "next instruction address" to provide a "prediction vector". Bits in the "prediction vector" respectively predict a sequence of "taken" and/or "not taken" states occurring for the branch instructions in the sequence of aligned sectors,predicted for outgating during the current FHT cycle. The prediction vector may be obtained from a recording made of "m"number of branches states immediately following the last execution of the instruction at the same address as the "next instruction address" provided for the current FHT cycle.

The "next instruction address" (used in the current FHT cycle) is hashed to obtain an AIC index, which locates both an associated AIC row and an associated FHT set. The associated FHT set contains either the next hit FHT entry or the next generated FHT entry, depending on whether the current FHT cycle gets an FHT hit or miss. An AIC hit is obtained if the associated AIC row is located at the AIC index hashed from the "next instruction address" of the current FHT cycle. An AIC miss is obtained if the associated AIC row at the hashed AIC index does not begin with the instruction located at the "next instruction address" provided for the current FHT cycle.

In response to an AIC miss, the basic blocks of instructions (next needed for execution) are fetched from the computer storage hierarchy starting at the memory address of the "next instruction address" of the current prediction. The fetched basic blocks are loaded in execution order into the aligned sectors from left-to-right in the associated AIC row.

The hashed AIC index is used to locate and access the associated FHT set. (This use of the AIC index to associate a FHT set to an AIC row causes problems, which are avoided by the subject invention.) A FHT miss occurs when the "next memory address" field in any FHT entry of the associated FHT set does not match the currently predicted next instruction address. (The currently predicted memory address is currently loaded in the processor's Instruction Fetch Address Register, IFAR).

An AIC miss also causes a FHT miss, and all FHT entries in the associated FHT set are invalidated. For an AIC hit having an FHT miss, any invalid FHT entry in the associated FHT set may be selected for replacement. If all FHT entries in the FHT set are valid, a LRU (least recently used) FHT entry in the set may be selected for replacement.

The first-generated FHT entry in its associated FHT set is generated in response to an AIC miss while the sectors in the associated AIC row are being loaded with the instructions of fetched basic block(s). This first-generated FHT entry specifies the left-to-right sequence of sectors in the associated AIC row. (Note that the left-to-right sequence of sectors in any AIC row may represent any execution order for basic blocks fetched from anywhere in the storage hierarchy.)

Thus, the first FHT entry in each FHT set is generated in response to both an AIC miss and an FHT miss. However, the second and later FHT entries in any FHT set are each generated in response to an AIC hit and an FHT miss for the current FHT cycle.

Therefore, an FHT hit requires 1) one or more FHT entries in the FHT set to be valid: 2) a match between the "next instruction address" from the last FHT cycle (which is also called the "next IFAR address") and the memory address of the first instruction in the associated AIC row (it is the first instruction in the first (leftmost) sector in the associated AIC row), and 3) a match between a bit-state sequence in the current prediction vector and a sub-field state sequence in a "branches outcomes" field in the hit FHT entry (indicating a sequence of branch taken and/or not taken states).

Although the disclosed embodiment in the incorporated specification requires each valid FHT entry to specify a different execution sequence in its FHT set, nevertheless each of these different sequences is constrained to begin with the same AIC sector, which is the first sector in the associated AIC row.

SUMMARY OF THE INVENTION

The subject invention adds new circuits and new processes to those disclosed in the incorporated specification to perform predictive processing without constraints occurring in the incorporated specification.

The subject invention's circuits and processes enable a greater variation in the sequence patterns of the sector histories executed for the AIC rows than the circuits and processes disclosed in the incorporated specification. This greater variation of sequence histories enables an increase in the average instruction execution rate for a program, even when no change is made in the processor's instruction execution rate, or in the size of the FHT or AIC. The subject invention operates using novel "FHT cycles", and does not use the "AIC cycles" disclosed for the invention in the incorporated specification.

A speedup in program execution rate is obtainable by the subject invention due to the greater variation in sequence patterns available to the program execution, caused by an increase in the FHT hit rate and reduction in the FHT miss rate.

The increase in the FHT hit rate increases the percentage of time that a processor spends using fast predictive instruction processing, and reduces the percentage of time that the processor spends using the slower conventional branch instruction processing. Predictive execution is faster because it eliminates the overhead time needed by conventional branch instruction processing in the program, such as determining branch-target instruction addresses and accessing branch target instructions in the computer storage hierarchy.

The fastest predictive execution performed by this invention occurs while its FHT cycles are continuously having FHT hits and AIC hits to provide a steady stream of instructions from the AIC to the processor execution pipeline without any overhead for conventional branch instruction processing.

Each FHT miss stops predictive processing and returns the processor to slower conventional instruction processing during which this invention generates a new FHT entry for defining the instruction execution sequence immediately following the FHT miss. This invention allows any number of FHT entries (theoretically up to the total number of FHT sets in the FHT) to be associated with any AIC row. The subject invention allows the FHT entries in the same FHT set to be associated with different AIC rows. This differs from the incorporated specification's embodiment in which each FHT entry in the same FHT set is associated with the same AIC row. This difference allows the invention to avoid the constraints in the incorporated specification's embodiment, in which the number of FHT entries in each FHT set is the maximum number of FHT entries which may be associated with any AIC row.

The order of operations in the process of the subject invention is different from the order of operations in the process of the incorporated specification. In the incorporated specification, the AIC hit/miss determination is made before the FHT hit/miss determination, while in the subject invention the AIC hit/miss determination is made after the FHT hit/miss determination. This change in sequence of operations by this invention is important to obtaining the advantages of the subject invention over the incorporated specification.

The process of this invention may be characterized as performing "FHT cycle" iterations. Each FHT cycle starts with a branch prediction provided by a branch prediction unit in the system. Each branch prediction utilizes a "next memory address" received from the prior FHT cycle iteration. The "next IFAR address" locates the next instruction which begins the execution of the current FHT cycle and begins the next basic block in the executing program. At the end of each FHT cycle, the "next memory address" is obtained and provided to the prediction unit for making a prediction used by the next FHT cycle. Each "next memory address" begins a next basic block in the program execution and is herein called the "next IFAR address" because it is loaded into the IFAR (instruction fetch address register) of the processor. The branch prediction unit receives the "next IFAR address" for generating a "branches outcomes prediction vector" (prediction vector). The prediction unit provides each prediction comprising a "next IFAR address" and a prediction vector for use by the next FHT cycle for making a FHT hit or FHT miss determination.

The first FHT cycle for a program loads IFAR with the program-entry memory address into the IFAR as the first "next IFAR address", which is provided to the prediction unit. The prediction unit uses the first "next IFAR address" to generate the first "outcomes prediction vector" which is used during the first FHT cycle to determine a FHT hit or FHT miss. At the end of the first FHT cycle, the "next IFAR address" is provided to the branch prediction unit for making a prediction for the next FHT cycle.

During each FHT cycle, either a FHT hit or FHT miss occurs. An FHT hit causes FHT predictive processing to be used during the FHT cycle, during which a sequence of AIC sectors is outputted from an AIC row and sent to the processor's instruction execution pipeline, assuming there is a AIC hit. A FHT miss causes the FHT cycle to use conventional instruction processing while generating a new FHT entry to represent the execution sequence conventionally obtained during the FHT cycle.

This invention operates fastest when successive FHT hits and AIC hits are occurring in consecutive FHT cycles, wherein each FHT cycle uses a short primary process to continuously loop.

If a FHT cycle has a FHT hit, an FHT entry provides the "next IFAR address" for the next FHT cycle. However, if a FHT cycle has a FHT miss, the "next IFAR address" is provided by conventional branch instruction processing initiated by the FHT miss for executing a sequence of instructions, from which a new FHT entry is generated, and at the end of this FHT cycle a target address of the last instruction in the sequence is provided to the prediction unit as the "next IFAR address" for the next FHT cycle.

After a FHT miss in a FHT cycle, the generation of a new FHT entry overlaps the instruction processing for the FHT cycle (including instruction fetching from computer memory for an AIC miss, or segment location in a hit AIC row for a AIC hit). The overlapped processing time for generating the new FHT entry should not be substantially longer than the conventional branch instruction processing time without generating the new FHT entry. During FHT misses with AIC hits, it is important that a sequence of segments be found quickly in the selected AIC row regardless of the order of the segments in the sequence. A Segment Distribution Table (SDT) is provided herein to minimize the time needed for locating a sector in an AIC row required by the sequence being determined for a new FHT entry being generated for a FHT miss.

Each outcomes prediction vector contains m number of bits, which respectively represent the branch states of a sequence of m number of branch instructions executed by the program. The first bit in the m bit sequence of each prediction vector represents the taken or not-taken branch state of the branch instruction ending a basic block having its first instruction located by the "next IFAR address" received from the previous FHT cycle. Each of the m bits in the prediction vector is set to either a zero or one state to indicate either the taken or not taken state for a sequence of m branch instruction consecutively executed after the instruction located by the "next IFAR address".

The vector generation process in the branch prediction unit may use a branch-state recording made during a previous execution of the program. The branch-state recording includes an indication of the taken or not taken state previously executed for each branch instruction in the execution sequence of the program For example, each branch instruction representation for a program execution may contain a taken or not taken state indication. The "next IFAR address" provided by the last FHT cycle may provide a locating index in the branch-state recording to locate a sequence of m basic blocks, (containing the sequence of m number of branch state indications ending m number of basic blocks. These m number of consecutive branch state indications are marked-out in the recording. The current prediction vector is then generated by respectively setting each of "m" number of sequential vector bits to either a zero or one state to represent the corresponding branch state indication in the marked out sequence in the recording.

Although there are m prediction bits in each prediction vector provided by the prediction unit, the prediction bits in the vector are used sequentially by the FHT cycles, and any cycle may consume from zero prediction bits to all m prediction bits in the current prediction vector. The number of prediction bits used in any FHT cycle is equal to the number of branch indications in the "arrangement" field of the current FHT entry; e.g. 0, 1, 2 and 3 are each branch indications. This variability in the number of vector bits used per FHT cycle depends on the number of no-branch indications in the "arrangement" field, since all no-branch indications in the "arrangement" field are skipped by the prediction vector during the matching process. The vector bits are consumed from left-to-right in the current prediction vector, and any unconsumed vector bits become the initial vector bit(s) in the next m bit predicted vector. When all sub-fields in the "arrangement" field contain no-branch indications (e.g. asterisks, *), none of the prediction bits are consumed in the FHT cycle, and the same vector bits are provided as the prediction vector for the next FHT cycle. An opposite example is when all sub-fields in the "arrangement" field contain branch instruction indications (0 or 1) in each of its sub-fields 0, 1, 2 and 3, and then the number of prediction bits consumed by the FHT cycle is equal to the total number of sectors in the AIC row. If an end-indicator exists in an the "arrangement" field, the number of prediction bits consumed by the FHT cycle is equal to the number of sub-fields in the "arrangement" field containing branch-instruction indications up to the end indication.

This invention ingeniously divides each "next IFAR address" (provided for the prediction of each FHT cycle) into a set of novel special fields which are used in the operation of this invention. These special fields include an "address tag" field, an "IFAR set number" field, and an IFAR sector number" field, which are used in the preferred embodiment for quickly locating a hit FHT entry. The "IFAR set number" field is used as an index in the FHT to locate a FHT set which may contain a FHT entry having a FHT hit. The "IFAR sector number" field is used with a novel Sector Distribution Table (SDT) for quickly locating an AIC sector address in an AIC directory entry for determining an AIC hit or miss during an FHT cycle for an FHT miss. The "address tag" field is used to verify that the SDT entry found by using the "IFAR sector number" field is the SDT entry associated with the "next IFAR address".

The "IFAR set number" field, is defined as K number of consecutive bits in the "next IFAR address" located at the low-order end of its "memory line address". (The "memory line address" is a well known part of each memory address used to locate a corresponding memory line in the computer memory containing a byte being addressed by the entire address.) The "address tag" is defined as the remaining high-order part of the "memory line address". The "IFAR sector number" field is comprised of the "IFAR set number" field extended at its low-order end by Q number of bits in its "next IFAR address", and $2^{**}Q$ is the number of sectors in each AIC row.

Hence, these special fields in the "next IFAR address" are related to the size of the FHT, to the size of the AIC rows, and the number of SDT entries in the SDT is related to the total number of sectors in the AIC. Nevertheless, each FHT set in the FHT may contain an arbitrary number of FHT entries, (even though the number of FHT sets in the FHT is determined by K number of consecutive bits in the "IFAR set number" field. Thus, the number of FHT entries per FHT set may be a single FHT entry or may be a plurality of FHT entries. It is convenient to have the same number of FHT entries in each FHT set in the FHT; for example, the preferred embodiment has four FHT entries per FHT set.

An example of these special fields may be given for a system using 64 bit memory addresses (each address comprised of bits 0 to 63). In this 64 bit address, its bits 0 to 56 comprise its "memory line address" (for locating and fetching a line of instruction's located on a line boundary in the computer memory). Then, address bits 57 to 63 may be used by the processor to locate a byte in the fetched memory line, which allows the 64 bit address to locate a byte anywhere in the computer memory. In this memory line address (e.g. bits 0 to 63), the "FHT set number" field is then comprised of the nine bits provided by the low-order bits 48 to 56 in the memory line address, and the "address tag" is comprised of the remaining high-order bits 0 to 47 (or a part thereof which is later explained herein) of the memory line address. Finally, the "IFAR sector number" field is comprised of the "FHT set number" field bits 48 to 56 extended on its low order end by Q bits, so that if Q is 2 (then $2^{}Q=4$ sectors per AIC row) the "IFAR sector number" field is comprised of the address bits 48 to 58** in the 64 bit address.

Each FHT entry contains a valid bit, LRU field, a "sectors outcomes" field, a "sector arrangement" field, an "initial sector address" field, a "next IFAR address" field, an "AIC index" field and an "AIC sector position" field. The valid bit indicates if the content of the FHT entry is valid; the LRU field indicates when a valid FHT entry was last used in the FHT set; the "initial sector address" field contains the memory address of the first AIC sector to be outgated in the sector sequence represented in the FHT entry (which may be any sector in the selected AIC row); the "next IFAR address" field contains the predicted next memory address which is provided to the branch prediction unit; the "AIC index" field locates an AIC row and its corresponding AIC directory entry and associates them with this FHT entry; and the "AIC sector position" field locates the sector position of the sector address in the associated AIC directory entry for verifying if the corresponding segment of instructions in the AIC row should be outgated for execution for the associated, FHT entry. (There may be duplication in the information contained in some of these FHT fields.)

During each iteration by a FHT cycle, a FHT set (containing a plurality of FHT entries) is located by the "IFAR set number" field (in the current "next IFAR address"), and a search is made in the FHT set of its valid FHT entry. A FHT hit requires a match on each of two fields in a valid FHT entry in the FHT set, including a match between the FHT entry's "initial sector address" field and the current "next IFAR address", and another match between the FHT entry's "sectors outcomes" field and bits in the prediction vector.

When a FHT hit is indicated for a FHT entry in the FHT set by this matching process, the FHT cycle quickly determines if an AIC hit exists. To quickly determine an AIC hit, the processor obtains the "AIC index" and "AIC sector position" fields from the hit FHT entry, and uses them to access the sector address at the indicated AIC sector N in the corresponding AIC directory entry at the indicated AIC index. If the Nth sector address (contained in the indicated Nth sector position in the AIC directory entry) matches the content in the "initial sector address" field of the FHT entry and the AIC directory entry are valid, an AIC hit is obtained. Then the LRU field of the hit FHT entry is adjusted to reflect this FHT entry is the most recently used entry in the FHT set. After the AIC hit is obtained, the "sector arrangement" field in the hit FHT entry controls the outputting of instructions in its specified sequence of sector(s) in the selected AIC row, and this sequence of instructions is sent to the processor execution pipeline for execution. The "next IFAR address" field in the hit FHT entry is sent to the branch prediction unit for making the vector prediction used by the next FHT cycle.

The matching process used to determine a FHT hit in the selected FHT set may be performed sequentially, in parallel, or by a combination of parallel and sequential operations on all FHT entries in the selected FHT set. Parallel matching operations may be done simultaneously on all fields in all FHT entries in the set to provide the fastest FHT hit/miss determination or in parallel on each valid FHT entry in the FHT set. Completely sequential operations are the slowest.

The valid bit states in all FHT entries in the set may be examined first, with the matching process continued on only the valid FHT entries. If no valid FHT entry is found in the set, an FHT miss is indicated. Next, the matching process further examines only the valid FHT entries in the set by matching the current IFAR address with the "initial sector address" field in each of the valid FHT entries. A mismatch eliminates the respective FHT entry. Then the bits in the current prediction vector are compared to sub-fields in the "sector branches outcomes" field in each non-eliminated FHT entry. An FHT entry provides a FHT hit if both fields match in any FHT entry in the set.

Thus the overall FHT matching process operates on one or more of three different fields in each FHT entry of the set, which are: the valid bit field, the "initial sector address" field, and the "sector branches outcomes" field. All of these three field must have a match for a FHT hit to occur in a FHT entry.

In any branches-outcomes-prediction vector, each vector bit may be set to either a 0 or 1, representing either a branch-not-taken, or a branch-taken prediction in a sequence of branch instructions. Each sub-field in any "sectors branches outcomes" field may contain one of the following indications: 0 represents a "branch not-taken" indication, 1 represents a "branch-taken" indication and 2 represents a "no-branch instruction" indication. Therefore, a match occurs for any "sectors branches outcomes" field in which all sub-fields contain the "no-branch instruction" indication (e.g. 2). Then if this match enables a FHT hit, all corresponding sectors in the associated AIC row are outgated for execution. Then the FHT process continues with the next FHT cycle using a prediction vector based on the "next IFAR address" field in the FHT entry. (The "no-branch instruction" indication is shown as an asterisk in some of the figures herein.)

The FHT matching rules are complex, not straightforward, and not obvious. Matching by the prediction vector includes complex alignment rules caused by the bits in the prediction vector only representing branch instructions, and the prediction vector bits being matched against sub-fields in a "sectors branches outcomes" field which may contain sub-fields that do not represent a branch instruction. This causes the prediction vector matching process to use unique dynamic alignment between the prediction vector bits and the sub-fields in the "sectors branches outcomes" field in order to correctly determine an FHT hit. This alignment process requires the leftmost bit in the prediction vector to be aligned with the leftmost outcomes sub-field having a branch instruction indication, and this requires each next vector bit to skip over any "no-branch" sub-field to any next "branch" sub-field in the "sectors branches outcomes" field, so as to prevent any attempted matching of any vector bit with any "no-branch" sub-field. In more detail, each vector bit has a taken or not-taken branch indication and does not have any "no branch" indication.

The vector bit matching process ends in any "sectors branches outcomes" field when any sub-field is detected to contain a "sequence-end" indication. A match is indicated for a "sectors branches outcomes" field when matches are found between all of its branch-indicating sub-fields up to any "sequence-end" indication and corresponding sequential vector bits starting with the left-most vector bit. The matching process ignores any vector bit(s) not matched with any sub-field(s) located before (to the left of) any "sequence-end" indicating sub-field. Any "outcomes" sub-field(s) after (to the right of) any "sequence-end" indicating sub-field are ignored in the matching process. Hence, a prediction vector may match and obtain an FHT hit, even if all bits in the vector have not been matched with all outcomes sub-fields.

If the initial (left-most) outcomes sub-field(s) consecutively contain no-branch-instruction" indications (e.g. asterisk), the first vector bit is aligned with the first "branch" sub-field to the right of these "no-branch" sub-fields. The rules stated above then determine if a match occurs between the prediction vector and the "sectors branches outcomes" field. A special case FHT hit is determined if all outcomes sub-field(s) in the "sectors branches outcomes" field contain "no-branch" indicating sub-fields,; and then none of the vector bits are aligned or matched with any of the sub-fields in the FHT entry.

When a FHT hit is determined for a FHT entry, an AIC hit or miss is next determined using fields in the hit FHT entry. This is done by using the content of the "AIC index" and the "AIC sector position" fields in the hit FHT entry to locate a sector in an AIC row and to locate a corresponding sector address in a located AIC directory entry. It is possible that the located AIC row had its sector contents changed and this AIC row no longer contains the initial sector indicated in the hit FHT entry, in which case an AIC miss occurs. Therefore, verification is required that the AIC sector,located by the hit FHT entry is still the AIC sector indicated in the hit FHT entry. This verification process uses the "AIC index" and "AIC sector position" fields in the hit FHT entry as follows: The "AIC index" field is used to locate an AIC directory entry, and the "AIC sector position" field is used to locate an "N-sector address" field in the located AIC directory entry (this "N-sector address" field locates in the computer memory the first instruction of the corresponding AIC sector). Then, this "N-sector address" is compared to the current IFAR address. An AIC hit is determined if these addresses match and the AIC directory entry is valid, because the located AIC row is verified to contain the instruction at the next IFAR address. If these addresses do not match, an AIC miss is determined.

When an AIC hit is determined for a hit FHT entry, the "sector arrangement" field in the current FHT entry is used to control the outgating sequence of sectors in the associated AIC row in the order specified in the "sector arrangement" field of the hit FHT entry. The first sub-field in the "sector arrangements" field indicates the first sector to be outgated, and each following sub-field in that "sector arrangements" field may select the same or any other sector in the associated AIC row to provide any order of sector outgating from the associated AIC row to the processor's instruction execution pipeline. The instructions in the outgated sectors may be put into an instruction sequence buffer (ISB) in the order of their outgating from the AIC row, and instructions in the ISB are provided to the execution pipeline of the processor for their execution. The outputted sequence may include from one sector to all sectors in the associated AIC row in whatever order is indicated in the "sector arrangement" field of the FHT entry.

The outgating of a defined sequence of sectors from a hit AIC row requires synchronization between the sub-fields in both the "arrangement" field and the "sectors branches outcomes" field of the hit FHT entry. The outgated sequence of segments is defined by the left-to-right order of sub-fields in the associated AIC row. Outgating controls synchronize the selection of corresponding sub-fields in the "arrangements" field and "sector branches outcomes" fields in the hit FHT entry, and sector outgating stops for the FHT entry when any end indicator is reached in the "arrangements" sub-field during the synchronized scanning of the sub-fields in both the "arrangement" field and the "sectors branches outcomes" field of the hit FHT entry. If the "sectors branches outcomes" field does not contain any end-indicator, the sector arrangement field controls the outgating of the sectors.

It is to be noted that the AIC index (for selecting an AIC row and corresponding AIC directory entry) may be selected as any available index in the AIC. However, it is convenient in the preferred embodiment to select an AIC index by applying a hashing algorithm to selected bits in the "initial IFAR address" field of the FHT entry containing the AIC index. This hashing algorithm may select any set of bits from the "initial IFAR address" field and apply a mathematical operation to these selected bits that computes a number within the range of the indices in the AIC, and this number may be used as the AIC index of that FHT entry. A preferred algorithm evenly distributes the selection of the index numbers within the range of AIC indices for an expected range of IFAR addresses.

An AIC miss generates the first FHT entry associated with the selected AIC row. A FHT miss with an AIC hit generates the second or later FHT entry associated with the located AIC row. A FHT hit with an AIC hit does not generate a new FHT entry.

When FHT cycles are operating with both FHT hits and AIC hits (which is expected over 90 percent of the time), it is essential to obtain instructions from the AIC at a speed faster than can be obtained by conventional branch instruction execution Then, the sectors are accessed and outputted from the hit AIC row in whatever order is specified in the hit FHT entry.

A unique fast way to access a sector located anywhere in an AIC row is disclosed by this specification of a novel Sector Distribution Table (SDT), which is used to locate a valid AIC sector needed for a sequence specified by a hit FHT entry. The "IFAR sector number" field in the current IFAR address is used as an index into the SDT to locate an associated SDT entry, and this SDT entry is tested for associativity with the IFAR address by comparing the "address tag" field in the IFAR address with an "address tag" field in the located SDT entry. If they match their associativity is confirmed, and a sector and its sector address are immediately accessed using an "AIC index" field in the SDT entry to locate the AIC row and the "sector position" field in the SDT entry to locate the specified sector position in that AIC row. No time is lost for searching the AIC row or directory entry for the required sector or sector address.

An SDT entry is generated for each sector written into an AIC row in response to an AIC miss. The SDT entry is located in the SDT by the "IFAR sector number" field in the current IFAR address. The "address tag" field in the IFAR address is written into the SDT "address tag" field, the AIC index (determined by hashing the current IFAR address) is written into the "AIC index" field, and the "AIC sector position" field in the SDT entry receives the AIC sector position being written into the AIC row. The SDT entry is then validated. Thus on an AIC miss, a new SDT entry is generated for each sector in the new AIC row, for which a valid sector address is written in the corresponding sector position in the AIC directory entry at the same AIC index.

A replacement control field is provided in each FHT entry, such as a "LRU (least recently used) bits" field for indicating the relative recency of use of the FHT entries in the same FHT set. Each time any FHT entry is accessed, its "LRU bits" field is set to indicate the most recently used state, and the "LRU bits" field in each of the other FHT entries in the same FHT set is set to indicate a less recently used state. Replacement of a LRU entry is necessary when all of the FHT entries in the set are valid, and an FHT entry in the set must be selected for replacement. Then the states of the "LRU bits" field in the FHT set are examined to find a least recently used entry in the FHT set as the replacement entry.

The address of each sequential instruction in a sector is determined by the processor adding the length of each next instruction to the address of the current instruction. When a branch instruction is reached at the end of a sector, the last effective outcomes sub-field for a sector indicates if the instruction is predicted taken or not taken. The target address of each branch instruction begins a new sector.

The Execution Mismatch Controls include a branch information queue (BIQ) which stores: an image of each branch instruction executed in the program, the address of the branch instruction, the address of its target instruction, and the last outcome of the branch instruction (taken or not taken, which is used as the prediction for the branch). When a branch executes, it is determined if its prediction stored in the BIQ is correct or not. If correct, nothing needs to be done. If incorrect and the actual outcome is taken, then the BIQ is corrected when the target address is computed or otherwise obtained from the BIQ, depending on the type of branch instruction. All the information about the last execution of each branch instruction is available in the BIQ, and an indication of where to go next to fetch more instructions. If the prediction is incorrect and the actual outcome is not-taken, then the address is determined for the next instruction, which is stored in IFAR.

BRIEF DESCRIPTION OF DRAWINGS

The subject matter which is regarded as the invention is particularly pointed out and distinctly claimed in the claims at the conclusion of the specification. The foregoing and other objects, features and advantages of the invention will be apparent from the following detailed description taken in conjunction with the accompanying drawings which are:

FIGS. 4, 5, 6, 7, 8 and 9 provide a flow-diagram of the novel method used by the preferred embodiment, in which:

FIG. 4 shows the primary process.

FIGS. 5, 6 and 10 show sub-processes for processing an AIC miss.

FIGS. 7, 8 and 9 show sub-processes for processing a FHT miss.

DESCRIPTION OF THE DETAILED EMBODIMENT

Acronym Definitions

Figure 1:
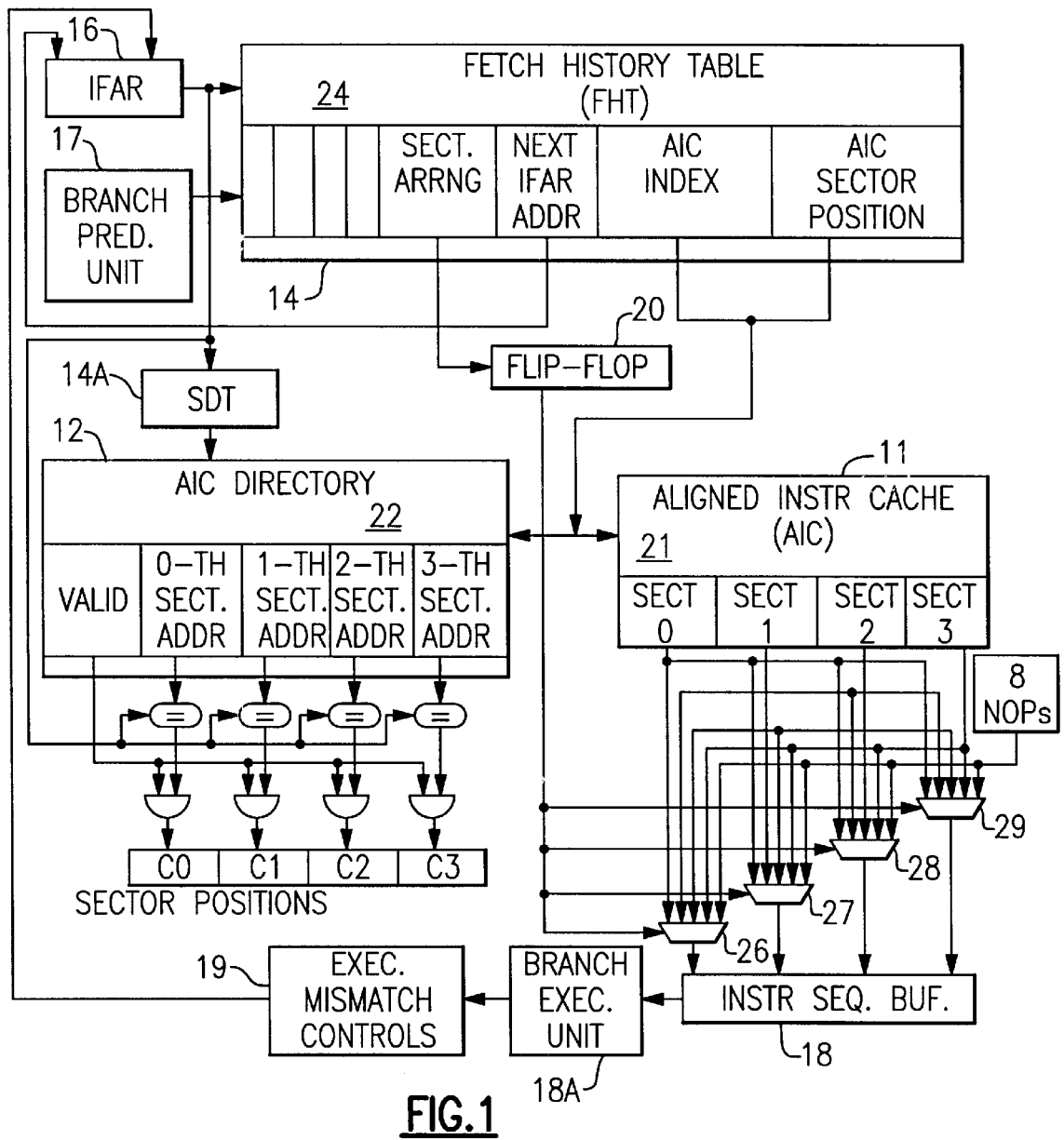
FIG. 1 shows the general hardware configuration of the preferred embodiment of the invention described herein.

AIC=Aligned Instruction Cache.
FHT=Fetch History Table.
SDT=Sector Distribution Table
D=a selected SDT entry in the Sector Distribution Table.
R=Selected AIC index, that selects an AIC row R and a corresponding AIC directory entry R.
IFAR=Instruction fetch address register (contains memory address of the next instruction to be provided to the execution pipeline of a processor).
Sector=a fractional part of a AIC row located on an aligned sector boundary for containing all or a part of a basic block.
F=Selected entry in a FHT set.
FT=Number of FHT entries in each FHT set
LRU=Least Recently Used indicator field in a FHT entry or in an AIC row.
Valid Bit=field for indicating the validity of all of the bits in its entry.
ISB=Instruction Sequencing Buffer (Buffer receiving instructions in execution sequence from outputted sectors of AIC).

Miss=Searched-for entry is not found.

Hit=Searched-for entry is found.

B=Vector bit count (locates a bit in the Prediction Vector).

L=Current Instruction count within an AIC Sector.

LT=Total number of instruction positions in each AIC sector

S=Index of a sector in an AIC row.

ST=Total number of sectors in each AIC row.

NOP=No Operation code (indicates no instruction exists in an instruction location in a sector).

RT=Total number of row in the AIC.

FT=Total number of entries in each FHT set.

Basic Block=a sequence of instructions in a program in computer memory ending with a branch instruction and starting at the target address of the last executed branch instruction in the program.

Memory-line address=the high-order part of a computer memory address used for accessing a line of data in the computer storage hierarchy.

FHT set=a group of contiguous FHT entries located by the current "FHT set number" used as an index in the FHT.

"FHT set number" field=a field in the current "next IFAR address", which is a set of contiguous bits located in the low-order part of the memory-line address component of the "next IFAR address", which is a computer memory address used for accessing a byte in the computer storage hierarchy.

"address tag" field=a set of contiguous bits comprised of the high-order part of the memory-line address adjacent to the "FHT set number" field.

"IFAR sector number" field=a set of contiguous bits in a computer memory address comprised of the "FHT set" field extended at its low-order end by Q number of bits in a. computer memory address, and 2**Q is the number of sectors in each AIC row.

"Next IFAR address"=the computer memory address provided at the end of each FHT cycle which is to be used as the basis for generating the "outcomes prediction vector" fore beginning the next FHT cycle, and it is the address of the first basic block to be fetched (from the AIC or memory if not in the AIC) during the next FHT cycle.

Sector Position=Sector Index S for locating a sector in any AIC row, starting at 0 for the leftmost sector in the AIC row.

S=Selected sector position in an AIC row.

C=Sub-field index for locating a set of corresponding sub-fields within the "Sector Arrangement" field and the "Sector Branches Outcome" field in a FHT entry.

"m"=Number of prediction bits in each Prediction Vector, in which the state of each bit indicates a taken or not taken prediction for a corresponding basic block in a program execution sequence.

GENERAL DESCRIPTION OF THE DETAILED EMBODIMENT

FIG. 1 generally represents an embodiment of the invention, which is preferably embodied in the hardware logic of a processor chip. The novel portions of the invention include the combination of elements shown in FIG. 1. It shows a Fetch History Table (FHT) 14, which contains a large number of FHT entries 24; the form of each FHT entry is more completely shown in FIG. 2B. The FHT contains a large number of FHT entries, for example it may contain 512 FHT entries. The FHT entries are divided among a plurality of FHT sets. For example, each set may include 4 FHT entries, and the FHT may contain 128 FHT sets.

The FHT 14 receives input from an IFAR (instruction fetch address register) 16 of the processor, and from a branch prediction unit 17.

The FHT entries are used to select AIC rows 21 in an AIC (aligned instruction cache) 11 through the use of corresponding AIC directory entries 22 in an AIC directory 12. A selected FHT entry is used to control the outgating of instructions in a sequence of sectors in a selected AIC row 21 in whatever sector order is indicated in a "sector arrangement" field in an associated FHT entry 24. The outgating is to an ISB (instruction sequence buffer) 18.

A flip-flop 20 is representative of the clock timing between the FHT selection operations and the AIC outgating operations occurring at different times in each FHT cycle, wherein the FHT entry is processed first and then the outgating occurs if there is an FHT hit.

The ISB 18 receives the outgated instructions from the AIC sectors in the order the sectors are sequenced for outgating. The ISB 18 outputs its stream of instructions to the processor's execution pipeline (not shown) in the order the instructions are received by ISB 18. The branch instructions in the output stream from ISB 18 are executed by a branch execution unit 18A which generates the actual target instruction addresses required for continuing the correct instruction stream for the program. These actual target addresses are provided from unit 18A to execution mismatch controls 19, which also receives the corresponding predicted target addresses synchronized with the output from ISB 18. Controls 19 compare each actual target address provided by unit 18A with any corresponding predicted instruction address to determine any errors in the prediction process. No prediction error is indicated if they match. But if a mismatch is indicated by "execution mismatch controls" 19, it thereby indicates a prediction error, and it causes a reset of the execution stream back to the instruction having the error and the execution stream is set back to that point from which it normally operates using the facilities of this invention.

Therefore, the "Instruction sequencing buffer" 18 receives the sequence of instructions in the sectors select for outputting from the AIC by gates 26, 27,28 and 29 to ISB 18 in the order specified by the currently selected FHT entry. In this manner, the sequence of instruction basic blocks is provided in execution order to the processor's instruction execution pipeline. The AIC misses cause the instructions in the executing program to be fetched on demand from the computer memory to the AIC for execution using AIC misses.

Initially, all instruction spaces in all sectors in the AIC are set to the NOP code, and the valid bits in all AIC directory entries are set to the invalid state to indicate no valid addresses exist in the AIC directory.

Thus, the invention generates and uses the FHT entries 24 which can define any execution sequence for the sectors in an associated AIC row. Each "next IFAR address" locates an associated FHT set which may contains one or more valid FHT entries. Each valid FHT entry specifies an executed sequence of sectors in an associated AIC row, wherein the sequence was recently executed by the program, and the sequence is expected to be repeated in the near future execution of the program. Each FHT specified sequence includes up to m number of basic blocks executed in the program which are located in an associated AIC row.

The invention operates in FHT cycles, in which each FHT cycle uses or generates a valid FHT entry. Each FHT cycle ends by providing a "next IFAR address" for use by the next FHT cycle.

This invention uses the "next IFAR address" provided by the last FHT cycle to generate a prediction vector to predict the branch taken/not-taken state for each of the next m number of branch instructions to be executed in the program, following the current "next IFAR address". During each FHT cycle, the current the "next IFAR address" and prediction vector are respectively matched against an "initial IFAR address" field and a "sectors outcomes" field in each valid FHT entry in a selected FHT set selected by an "IFAR set number" field in the current "next IFAR address". If any FHT entry in the selected FHT set is found to match on both of these fields, that FHT entry provides an FHT hit, and it is immediately used during the current FHT cycle to control the outgating for execution of its specified sequence of sectors from the associated AIC row. This immediate outgating of a sequence of sectors immediately provides for execution a relatively large number of instructions which may contain one or more branch instructions without any delay for the processing of included branch instructions for a determination of branch target addresses, which otherwise would need to be done and would cause delays in the execution of this instruction sequence that would slow down the processor operations.

Whenever during any FHT cycle, no FHT entry is found to match both the current "next IFAR address" and prediction vector, an FHT miss occurs, and a new FHT entry is generated for the associated FHT set using conventional branch instruction processing. The conventional branch instruction processing ends for the FHT cycle when the generation of the new FHT entry is completed, and the "next IFAR address" is obtained (which is the branch target address of the last branch instruction in the sector sequence of instructions specified by the new FHT entry).

Thus in each FHT cycle, the invention either: has a FHT hit that uses a valid FHT entry in an associated FHT set (for outgating from the AIC for execution up to the next m number of basic blocks), or has an FHT miss that generates an FHT entry in the associated FHT set (for representing an instruction sequence obtained by conventional execution).

The first FHT entry generated for any FHT set represents the left-to-right sequence of blocks stored in an associated AIC row. Any second, or later, generated FHT entries associated with the same AIC row specifies a sequence of the sectors in the associated: AIC row different from the sequence specified in the valid first generated FHT entry for the AIC row.

The FHT entries associated with the same AIC row may be in different FHT sets. Also the FHT entries in any FHT set may be associated with different AIC rows.

A Sector Distribution Table (SDT) is provided to enable total flexibility in the sequencing of the sectors for the generation of the FHT entries to avoid the sequencing restriction which occurred in the embodiment in the incorporated specification Ser. No. 09/235,474, which restriction required the first block stored in the left-to-right order in the associated AIC row to be the first block in each of the execution sequences represented in all valid FHT entries associated with the same AIC row (which are all in the same FHT set in the incorporated specification).

The SDT entries are associated with the different sectors in the different AIC rows. Each SDT entry is associated with the memory address of the first instruction in a respective sector by being located by the "IFAR sector number" field in that address. SDT enables the FHT generation process to locate the sector positions of instructions stored in the sectors of an associated AIC row in a sequence being executed by conventional branch processing while generating an FHT entry.

During the generation of any FHT entry in any FHT set, the current "next IFAR address" in the processor's IFAR locates the beginning of a block which is being loaded into a sector of the associated AIC. The "IFAR sector number" field is obtained from this "next IFAR address" (the first address of a basic block), and it is used as an index in the SDT to locate a SDT entry. The located SDT entry then has its "address tag" field matched to the "address tag" field in the current "next IFAR address"; and if they compare equal, the accessed SDT entry is verified as associated with the "next IFAR address". This SDT entry then determines that the current "next IFAR address" is to be put into in a sequence being determined for the FHT entry being generated.

During the process of generating any FHT entry, "sector arrangement" and "sectors branches outcomes," fields are generated to specify the sequence for the FHT entry being generated. These two fields each have a number of sub-fields equal to the number of sectors in any AIC row. The generating process for these fields uses an index C which is initially set to zero (i.e. C=0) to locate the leftmost sub-field in each of these two fields, and C is incremented by one to locate the next sub-field to the right for each executed block available in the associated AIC row, until a next executed block is not available in the associated AIC row. The corresponding sub-field at index C in the sector branch outcome field is set to indicate whether the associated AIC sector ends in a branch-taken instruction, a branch not-taken instruction, or does not end in a branch instruction, such as by using two bits for each sub-field to indicate either 0, 1 or 2 to respectively represent these conditions (the 2 may be considered to represent an asterisk, *). Thus, the sub-fields represent a current execution sequence of blocks available in the associated AIC row, and any block available in the AIC row may be the first block in the execution sequence for the FHT entry, which are recorded in left-to-right sub-field order as the blocks are being executed and as the sector numbers of the blocks are being determined in the associated AIC row.

A significant difference exists in the generation of the sub-field values for the first FHT entry generated for an AIC row (it is generated when an AIC row is generated) in a FHT set and for other FHT entries generated for the same AIC row in the set. This is because the leftmost (first) sub-field in the first FHT entry generated for an AIC row in a set always represents the leftmost (first) sector in the associated AIC row, which is always the first executed sector in the execution sequence represented by the first-generated FHT entry. The first FHT entry generated for an AIC row may or may not be the first entry in the FHT set. The successive FHT entries generated for the same AIC row may or may not be in the same FHT set and these FHT entries may or may not have the leftmost (first) sub-field as the leftmost (first) sector in the associated AIC row. Also, due to the LRU replacement algorithm employed to maintain the FHT entries, the first FHT entry generated for an AIC row may be replaced by another FHT entry for the same AIC row with a different "branch outcomes" field. It may also be replaced by another FHT entry for a different AIC row.

The leftmost (first) sub-field in any FHT entry that has not been generated when the AIC row was generated may represent any sector in the associated AIC row, since its first executed block may be located in any sector of the associated row. Therefore for each next-incremented sector index, C+1, a technique must be provided for finding the next executed sector available in the associated row in the block sequence being currently executed for a program. The SDT is used for determining the sector number S for a currently executing block available in the associated AIC row.

Figure 2A:
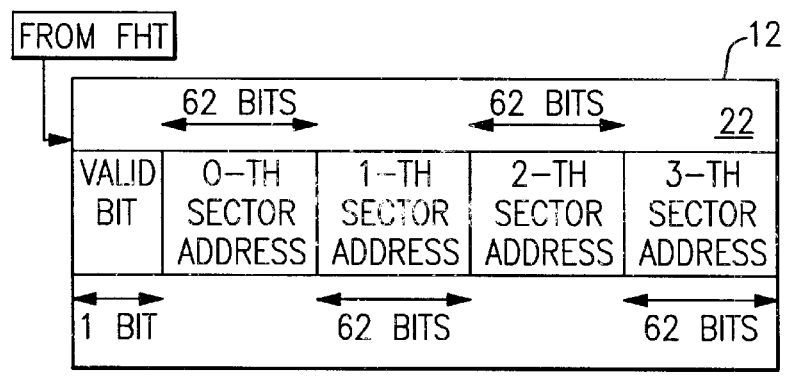
FIG. 2A represents a "directory for a aligned instruction cache" (AIC directory) and shows an example of the fields in each directory entry in the AIC directory
Figure 2B:
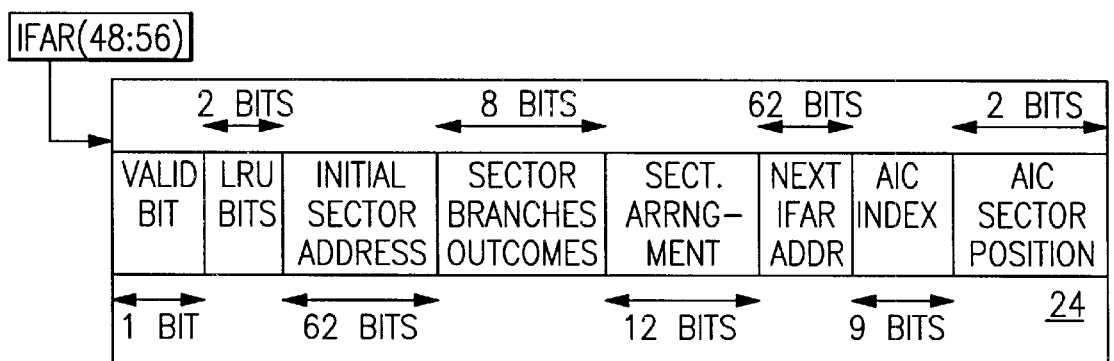
FIG. 2B shows an example of a FHT entry in the "fetch history table" (FHT) used in the detailed embodiment described herein.

FIG. 2A shows the form of each AIC directory entry 22 in the AIC directory 12. FIG. 2B shows the form of each FHT entry 24 in FHT 14.

The AIC rows 21 in AIC 11 are located in the AIC at indices 0 through 511. The FHT entries 24 in FHT 14 are located at indices 0 through 2047. (It is to be noted in this invention that the index R of any AIC row does not locate any FHT set associated with this AIC row, as it does in the incorporated specification.)

Each AIC row is divided into; a plurality of sectors, each being at a sector position S in its AIC row, of which the first sector in the row is the leftmost sector at the first sector position 0. (The example in FIG. 1 shows four sectors in each AIC row of the AIC 11.) Each sector contains from one to L number of instructions. The instructions in any sector are always consecutively located in the sector in the same order that they are located in the processor memory from which they were fetched.

An AIC directory 12 contains an AIC directory entry at the AIC index R which corresponds to an AIC row at AIC index R in the AIC. Therefore the AIC index R locates a corresponding AIC directory entry in the AIC directory and a corresponding AIC row R in the AIC. Each AIC directory entry is divided into five fields comprising a "valid" field and four "Nth sector address" fields, in which N is the sector position of the corresponding sector in the corresponding AIC row R. The "valid" field contains a valid bit. If the valid bit is 1, it indicates that each of the sector address fields ion the AIC directory entry are valid. Thus Each sector address is the address of the first instruction in its sector in the associated AIC row 21. In the preferred embodiment, all the sectors in the AIC row is either all valid or all invalid, depending on the state of the valid bit in the corresponding AIC directory entry.

FIG. 2B shows the fields in each FHT entry in the detailed embodiment, which are:

(1) "Valid" field: One bit to indicate if the content of this FHT entry is valid (=1) or invalid (=0). The 0 invalid state indicates the space in the respective entry is available for being recorded as a new FHT entry in its FHT set corresponding to the associated AIC row. The 1 valid state indicates the FHT entry is available for being used to outgate sectors from an associated AIC row identified in the FHT entry.

(2) "LRU" field: 2**Q is the number of FHT entries in each FHT set, and P is the number of bits in the LRU field of each FHT entry to indicate how recently the FHT entry has been used relative to the other FHT entries in the FHT set. For example, if P is 2, then there are four FHT entries per FHT set, in which:

least recently used FHT entry indicates: LRU bits="00"
second least recently used FHT entry indicates: LRU bits="01"
third least recently used FHT entry indicates: LRU bits="10"
most recently used FHT entry indicates: LRU bits="11"

(3) "Initial Sector Address" field: Contains the sector address of the first sector in the sequence specified by the FHT entry.

(4) "Sector Branches Outcome": Index C used to locate the sub-fields in the arrangements field is also used to locate corresponding sub-fields in the sector branch outcomes field in the same FHT entry. In the sector branch outcomes field, the content of each corresponding sub-field indicates the branch outcome of the corresponding sector identified in the "sector arrangements" field of the same FHT entry. Each outcome sub-field indicates one of the following three conditions for its corresponding sector: the sector's branch-instruction is taken, the sector's branch-instruction is not taken, or no branch instruction exists in the sector. These three outcomes for any sector are indicated by one of the following indicators: 0, 1 or 2 in which 2 may be represented as an asterisk (*). Thus, a variable number of basic blocks can be handled in any FHT entry, which is determined by the number branch instructions represented by the outcomes in the FHT entry.

(5) "Sector Arrangement" field: This field has ST number of sub-fields, equal in number to the ST number of sectors S in each AIC row. Each sub-field can locate any sector in the associated AIC row R, or contain a sequence-ending character. The execution sequence represented by the FHT entry containing this field is indicated by the left-to-right order of sector-identifying sub-fields. The end of the identified sequence is indicated by a special character placed in the sub-field following the last sub-field identifying a sector in the specified sequence when less than all sub-fields in the field are used to identify valid sub-fields. When all sub-fields in the field are used to identify sub-fields in the specified sequence, no special character is placed in the arrangements field. (In the preferred embodiment, ST=4, and therefore each sub-field contains a number from 0 through 4, in which any sub-field in the specified sequence may contains 0 to 3 to identify one of sectors 0–3 in the associated AIC row, and 4 is placed in any sub-field ending a specified sequence of less than four sectors. The location of each sub-field in the arrangements field is indicated by an index C, which is incremented by one to the next sub-field starting from the leftmost sub-field which has an index of 0 in the arrangements field.

(6) "Next IFAR Address" field: This field indicates the predicted "next IFAR address" to be used for the next FHT fetch cycle.

(7) "AIC Index" field: An index field used to locate and associate the FHT entry with both an AIC row and its corresponding AIC directory entry.

(8) "AIC Sector Position" field: Used to locate and associate the FHT entry with a sector position S in both an AIC row and its corresponding AIC directory entry located by the "AIC index" field in the FHT entry. In the AIC row and directory entry, the sector positions are ordered in left-to-right order in which S=0 is the position of the leftmost sector.

Figure 2C:
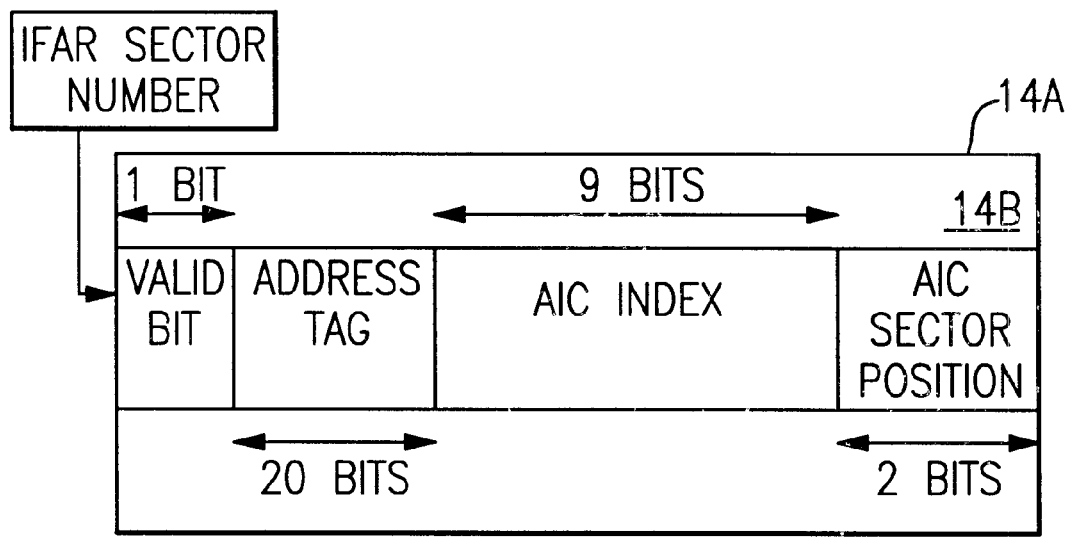
FIG. 2C–2D represents a "sector distribution table (SDT) for all sectors in an associated aligned instruction cache" (AIC directory) and shows an example of the fields in each SDT entry in the SCT directory

FIG. 2C represents the form of each SDT entry in the described embodiment, which includes the following fields;

(1) "Valid Bit" field: A single bit for indicating if the content of this SDT entry is valid (=1) or invalid (=0). The 0 invalid state indicates the content of this SDT entry must not be used. The 1 valid state indicates the contents of the SDT entry may be used in the generation of a FHT entry. Special conditions may exist which indicate a valid SDT entry should be invalidated and changed to meet the conditions of a FHT entry currently being generated.

(2) "Address Tag" field: A comparison field used to validate an association between the SDT entry's current content and the IFAR address used to locate this SDT entry.

(3) "AIC Index" field: An index field used to locate and associate the SDT entry with both an AIC row and its corresponding AIC directory entry.

(4) "AIC Sector Position" field: Used to locate and associate the SDT entry with a sector position S in both an AIC row and its corresponding AIC directory entry located by the "AIC index" field in the SDT entry. In the AIC row and directory entry, the sector positions are ordered in left-to-right order in which S=0 is the position of the leftmost sector.

Figure 2D:
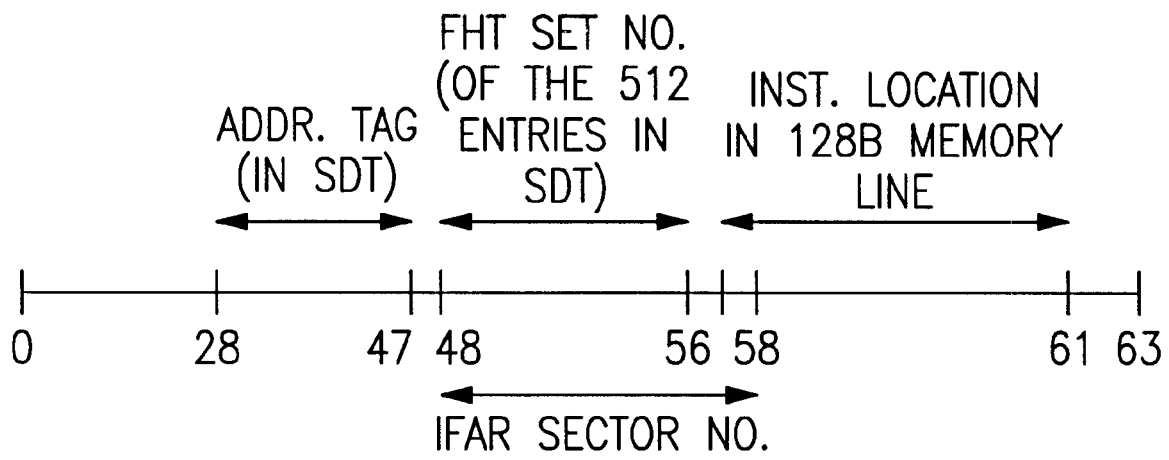

FIG. 2D is an example of a system memory address loaded into IFAR which locates a byte in the main memory of a computer system, and is being used as a "next IFAR address" to locate a FHT entry and a SDT entry.

This invention divides each "next IFAR address" (provided at the end of each FHT cycle for the next FHT cycle) into a set of novel special fields, including an "address tag" field, an "IFAR set number" field, and an IFAR sector number" field, which are used to locate a FHT set and a SDT entry (both associated with the address containing these fields). The "IFAR set number" field is used as an index into the FHT to locate an associated FHT set which may contain a FHT entry having a FHT hit. The "IFAR sector number" field is used as an index in a novel Sector Distribution Table (SDT) for quickly locating an associated AIC sector in an AIC row and use in sequencing that sector for a FHT entry currently being generated for the AIC row. The "address tag" field is used to verify that the SDT entry found by using the "IFAR sector number" field is the SDT entry associated with the "next IFAR address".

The "IFAR set number" field 1is defined as K number of consecutive bits located at the low-order end of the "memory line address". in the "next IFAR address". (The "memory line address" is a well known part of each memory address used to locate a line of bytes in the computer memory (e.g. SDRAMS) The "address tag" is defined as the remaining high-order part of the "memory line address" outside of the "IFAR set number" field.

The "IFAR sector number" field is comprised of the "IFAR set number" field extended at its low-order end by Q number of bits in the "next IFAR address", whereby 2**Q is the number of sectors in each AIC row. Hence, these special fields in each "next IFAR address" are related to the size of the FHT, to the size of the AIC rows, and to the number of SDT entries in the SDT which is the total number of sectors in the AIC.

Nevertheless, the size of each FHT set in the FHT may be an arbitrary number of FHT entries, (even though the number of FHT sets in the FHT is determined by K number of consecutive bits in the "IFAR set number" field. It is convenient to have the same number of FHT entries in each FHT set in the FHT; for example, the preferred embodiment has four FHT entries per FHT set. A particular number, such as 4, may be chosen as the number of FHT entries per FHT set for a processor. Thus, the number of FHT entries per FHT set may be a single FHT entry per FHT set, or may be any plurality of FHT entries per FHT set for a processor.

An example of these special fields may aid an understanding of the memory address size and of these special fields. For example, a system may be designed to use a 64 bit memory address size having each address comprised of bits 0 to 63 (bit 0 being the highest order bit and bit 63 being the lowest order bit) for providing a byte address in a computer memory. Since a 4 byte instruction size is assumed in the examples of this specification, only the high-order 62 bits 0–61 are needed for addressing instructions in the computer memory.

In this example of a 64 bit address size, bits 0 to 56 may comprise its "memory line address" (for locating and fetching a 128 byte line of instructions located on the line boundaries of the computer memory). Then, address bits 57 to 63 may be used by the processor to locate a byte in any fetched memory line, which allows the 64 bit address to locate a byte anywhere in the real computer memory Thus in this example of a memory address comprised of bits 0 to 63 (the 64 bit address), the "IFAR set number" field is then comprised of the nine (K=9) low-order bits 48 to 56 in the memory line address of the address (comprised of bits 0–63). Then, its "address tag" is comprised of the remaining high-order part (bits 0 to 47) of the memory line address. Finally, the "IFAR sector number" field is comprised of the "IFAR set number" field (bits 48 to 56) extended by Q bits on its low order end. Then, if Q is 2 (e.g. 2Q=4 sectors per AIC row), two bits are added to the low order end of the "IFAR set number" field (bits 48 to 56 plus bits 57 and 58) to comprise the "IFAR sector number" field of the address bits 48–58** in the memory address.

Examples Using the FHT and AIC

Figure 3:
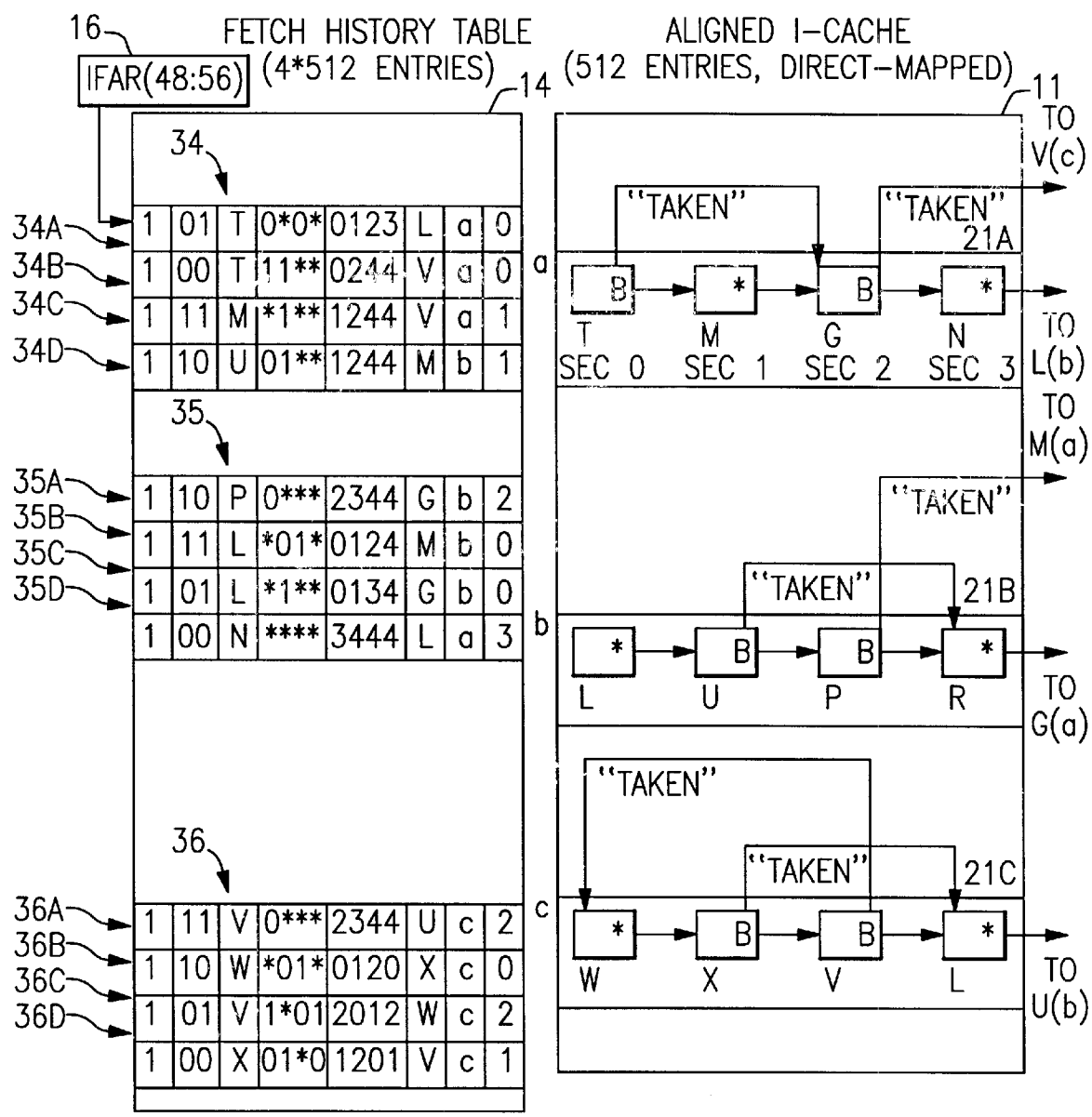
FIG. 3 illustrates an example of two different FHT sets in an FHT and the relationship between one or the FHT entries in each FHT set and respective AIC rows in an aligned instruction cache.

FIG. 3 shows some examples using the FHT entries to control outgating from selected AIC rows in a computer system. In these examples, the leftmost field in each of the FHT entries in FHT sets 34, 35 and 36 indicates all FHT entries are valid in each set. Each of the FHT sets 34, 35 and 36 contains 4 FHT entries, and each AIC row contains 4 aligned sectors SEC 0, SEC 1, SEC 2 and SEC 3, which in AIC row a are labeled T, M, G, N in AIC row b are labeled L, U, P, R, and in AIC row c are labeled W, X, V, L.

The first example 1 is given with three consecutive FHT cycles 1, 2 and 3. Example 1 begins by having a current prediction providing a current IFAR address, L, and a prediction vector, 0110. Cycle 1 uses the current IFAR address, L, to access FHT set 35, which has a FHT hit in FHT entry 35B, since L matches the "initial IFAR address" field in FHT entry 35B, and the first two prediction bits, 01, match the *01* "arrangement" field in FHT entry 35B. FHT entry 35B selects AIC row "b" as its associated row, and indicates sector position 0 as the first sector to be outgated in the specified sector sequence 0, 1 and 2 in its "arrangement" field (note that 4 is a sequence-end indicating character and does not specify any sector). The specified sectors L, U, P are then outgated from AIC row "b" for execution in the specified order. The "next IFAR address" M in FHT entry 35B now becomes the current IFAR address, containing the "FHT set number" field comprised of its bit positions 48–56 which are used as the FHT index for the next FHT cycle to locate the FHT set for the next FHT cycle.

The next cycle 2 uses the current IFAR address, M, to access FHT set 34, which has a FHT hit in FHT entry 34C, since M matches the "initial IFAR address" field in FHT entry 34C, and the next prediction bit, 1, matches the *1 "arrangement" field in FHT entry 34C. FHT entry 34C selects AIC row "a" as its associated row, and indicates sector position 1 as the first sector to be outgated in the specified sector sequence 1 and 2 in its "arrangement" field. The specified sectors M, G are then outgated from AIC row "a" for execution in the specified order. The "next IFAR address" V in FHT entry 34C now becomes the current IFAR address, containing the "FHT set number" field comprised of its bit positions 48–56** which are used as the FHT index for the next FHT cycle to locate the FHT set for the next FHT cycle.

The last cycle 3 in example 1 uses the current IFAR address, V, to access FHT set 36, which has a FHT hit in FHT entry 36A, since V matches the "initial IFAR address" field in FHT entry 36A, and the next unused prediction bit, 0, matches the 0*** "arrangement" field in FHT entry 36A. FHT entry 36A selects AIC row "c" as its associated row, and indicates sector position 2 as the first sector to be outgated in the specified sector sequence 2 and 3 in its "arrangement" field. The specified sectors V, L are then outgated from AIC row "c" for execution in the specified order. The "next IFAR address" V in FHT entry 36A now becomes the current IFAR address, containing the "FHT set number" field comprised of its bit positions 48–56 which are used as the FHT index for any next FHT cycle to locate the next FHT set.

Example 1 may be summarized as follows:

| FHT Cycle | FHT Entry | Vector Bits Used | Selected AIC Row | Outputted Sequence of AIC Sectors | | |
|---|---|---|---|---|---|---|
| 1 | 35B | 01 | "b" | L | U | P |
| 2 | 34C | 1 | "a" | M | G | |
| 3 | 36A | 0 | "c" | V | L | |

Example 2 has a sequence of consecutive FHT cycles for providing instructions for executing a loop, involving use of different FHT entries in the same FHT set. Only cycles 1, 2 and 3 need to be explained in detail, since its following cycles in the loop are repetitions of cycles 1, 2 and 3. This example begins with a current prediction providing a current IFAR address, W, and a prediction vector, 0101001010101 . . . . Cycle 1 uses the current IFAR address, W, to access FHT set 36, which has a FHT hit in FHT entry 36B, since V matches the "initial IFAR address" field in FHT entry 36B, and the first two prediction bits, 01, match the *01* "arrangement" field in FHT entry 36B. FHT entry 36B selects AIC row "c" as its associated row, and indicates sector position 0 as the first sector to be outgated in the specified sector sequence 0, 1, 2, 0 in its "arrangement" field which specifies sectors W, X, V, W for being outgated from AIC row "c" for execution in the specified order. The "next IFAR address" X in FHT entry 36B now becomes the current IFAR address, containing the "FHT set number" field comprised of its bit positions 48–56 which are used as the FHT index for the next FHT cycle to locate the FHT set for the next FHT cycle.

The next cycle 2 uses the current IFAR address, X, to access FHT set 36, which has a FHT hit in FHT entry 36D, since X matches the "initial IFAR address" field in FHT entry 36D, and the next unused prediction bits, 010, match the 01*0 "arrangement" field in FHT entry 36D. FHT entry 36D selects AIC row "c" as its associated row, and indicates sector position 1 as the first sector to be outgated in the specified sector sequence 1, 2, 0, 1 in its "arrangement" field. Then, the specified sectors X, V, W, X are then outgated from AIC row "c" for execution in the specified order. The "next IFAR address" V in FHT entry 36D now becomes the current IFAR address, containing the "FHT set number" field comprised of its bit positions 48–56 which are used as the FHT index for the next FHT cycle to locate the FHT set 36 for the next FHT cycle, which uses the current IFAR address, V, for next FHT cycle.

The next cycle 3 uses the current IFAR address, V, to again access FHT set 36, which has a FHT hit in FHT entry 36c, since V matches the "initial IFAR address" field in FHT entry 36C, and the next unused prediction bits, 101 to match the 1*01 "arrangement" field in FHT entry 36C. FHT entry 36C selects AIC row "c" as its associated row, and indicates sector position 2 as the first sector to be outgated in the specified sector sequence 2, 0, 1, 2 in its "arrangement" field. Then, the specified sectors V, W, X, V are then outgated from AIC row "c" for execution in the specified order. The "next IFAR address" V in FHT entry 36C now becomes the current IFAR address, containing the "FHT set number" field comprised of its bit positions 48–56 which are used as the FHT index for the next FHT cycle to again locate the FHT set 36 for the next FHT cycle, which uses the current IFAR address, W, for accessing FHT entry 36B in next FHT cycle, which repeats the FHT cycles 1, 2 and 3. This looping of the cycles 1, 2 and 3 continues until an exit occurs from the loop when a branch mismatch is detected by execution mismatch controls 19.

Example 2 may be summarized as follows:

| FHT Cycle | FHT Entry | Vector Bits Used | Selected AIC Row | Outputted Sequence of AIC Sectors | | | |
|---|---|---|---|---|---|---|---|
| 1 | 36B | 01 | "c" | W | X | V | W |
| 2 | 36D | 010 | "c" | X | V | W | X |
| 3 | 36C | 101 | "c" | V | W | X | V |
| 4 | 36B | 01 | "c" | W | X | V | W |
| 5 | 36D | 010 | "c" | X | V | W | X |
| 6 | 36C | 101 | "c" | V | W | X | V |
| 7 | Repeat cycle 1 | | | | | | |
| 8 | Repeat cycle 2 | | | | | | |
| 9 | Repeat cycle 3 | | | | | | |
| 10 | Etc. | | | | | | |

The third and final example given herein is a more complicated example of a loop using multiple AIC rows, instead of all cycles accessing the same AIC row, as is done in example 2. The consecutive FHT cycles of example 3 also provide a sequence of instructions for executing a loop. Example 3 starts with a current prediction of: an "next IFAR address" of U, and a prediction vector bit sequence having bits 0110011001100110. Each cycle only uses the leftmost vector bits unconsumed by a prior cycle; each cycle consumes the vector bits matching any branch-instruction bits in its FHT "arrangement" field. Only cycles 1, 2 and 3 need to be explained in detail, since its following cycles 4, etc. repeat the loop cycles 1, 2 and 3. Example 3 begins with its cycle 1 using the current IFAR address, U, (containing an "IFAR set number" field that accesses FHT set 34), and matches address U to the "initial IFAR address" field in each FHT entry in set 34. When matching is done between the two branch bits in the 01 ** "arrangement" field of FHT entry 34D and the first two prediction vector bits, 01, a match is obtained and a FHT hit occurs. FHT entry 34D indicates a selection of AIC row "b" as its associated row, and indicates sector position 1 as the first sector to be outgated. The-sector sequence 1, 2 is specified in its "arrangement" field which controls the outgating of sectors U, P from the associated AIC row "b" for execution in the specified order. The "next IFAR address" M in FHT entry 34D now becomes the current IFAR address, M, which contains a "FHT set number" field comprised of its bit positions 48–56 next used as an FHT index in the next FHT cycle to locate the next FHT set.

The next cycle 2 uses the current IFAR address, M, to access FHT set, 34, which has a FHT hit in FHT entry 34C, since M matches the "initial IFAR address" field in FHT entry 34C, and the next unconsumed prediction bit, 1, matches the *1** "arrangement" field to provide a FHT hit in FHT entry 34C. FHT entry 34C indicates AIC row "a" as its associated row, and indicates sector position 1 as its first sector to be outgated, and its "arrangement" field specifies a sector sequence 1, 2, 0, 1, which controls the outgating of the sectors M, G from AIC row "a" for execution in the specified order. The "next IFAR address" V in FHT entry 34C now becomes the current IFAR address, containing the "FHT set number" field its bit positions 48–56 which are used as the FHT index for the next FHT cycle to locate FHT set 36.

Then cycle 3 uses the current IFAR address, V, to access FHT set 36, in which has a FHT hit occurs in FHT entry 36A, since IFAR address V matches the "initial IFAR address" field in FHT entry 36A, and the next unconsumed prediction bit, 0, matches the "arrangement" field, 0***, in FHT entry 36A. The hit FHT entry 36A selects AIC row "c" as its associated row, and indicates sector position 2 as the first sector to be outgated in the specified sector sequence 2, 0, 1, 2 in its "arrangement" field. Then, the specified sectors V, W, X, V are then outgated from AIC row "c" for execution in the specified order. The "next IFAR address" V in FHT entry 36A now becomes the current IFAR address, containing the "FHT set number" field comprised of its bit positions 48–56 which are used as the FHT index for the next FHT cycle to locate the FHT set 34 for the next FHT cycle, which uses the current IFAR address, U, for accessing FHT entry 34D in next FHT cycle, which repeats the FHT cycles 1, 2 and 3. This repeats the looping performed in cycles 1, 2 and 3 through AIC rows "b", "a", "c", which continues until an exit occurs from the loop when a branch mismatch is detected by execution mismatch controls 19.

Example 3 may be summarized as follows

| FHT Cycle | FHT Entry | Vector Bits Used | Selected AIC Row | Outputted Sequence of AIC Sectors | |
|---|---|---|---|---|---|
| 1 | 34D | 01 | "b" | U | P |
| 2 | 34C | 1 | "a" | M | G |
| 3 | 36A | 0 | "c" | V | L |
| 4 | 34D | 01 | "b" | U | P |
| 5 | 34C | 1 | "a" | M | G |
| 6 | 36A | 0 | "c" | V | L |
| 7 | Repeat cycle 1 | | | | |
| 8 | Repeat cycle 2 | | | | |
| 9 | Repeat cycle 3 | | | | |
| 10 | Etc. | | | | |

Note that some of the FHT entries in the FHT sets 34, 35 and 36 specify sequences that do not start with a first sector position, 0, in an associated AIC row. It is a novel characteristic of this invention that any FHT entry's outputted sector sequence may start with any sector in the associated AIC row. Any of the FHT specified sector sequences are allowed to branch within the specified AIC row either backward (from right to left) or forward (from left to right) within the AIC row. Thus, in the FIG. 3 examples AIC rows "a" and "b" illustrate forward branching within the associated AIC row, and AIC rows "c" illustrates backward branching within its associated AIC row. Any AIC row may have one or more branch instructions capable of branching outside of its AIC row, as is illustrated by AIC rows "a" and "b".

DETAILED DESCRIPTION OF PROCESSING BY THE PREFERRED EMBODIMENT

FIGS. 4 through 9 describe detailed steps in a novel process performed by the hardware represented in FIG. 1.

Figure 4:
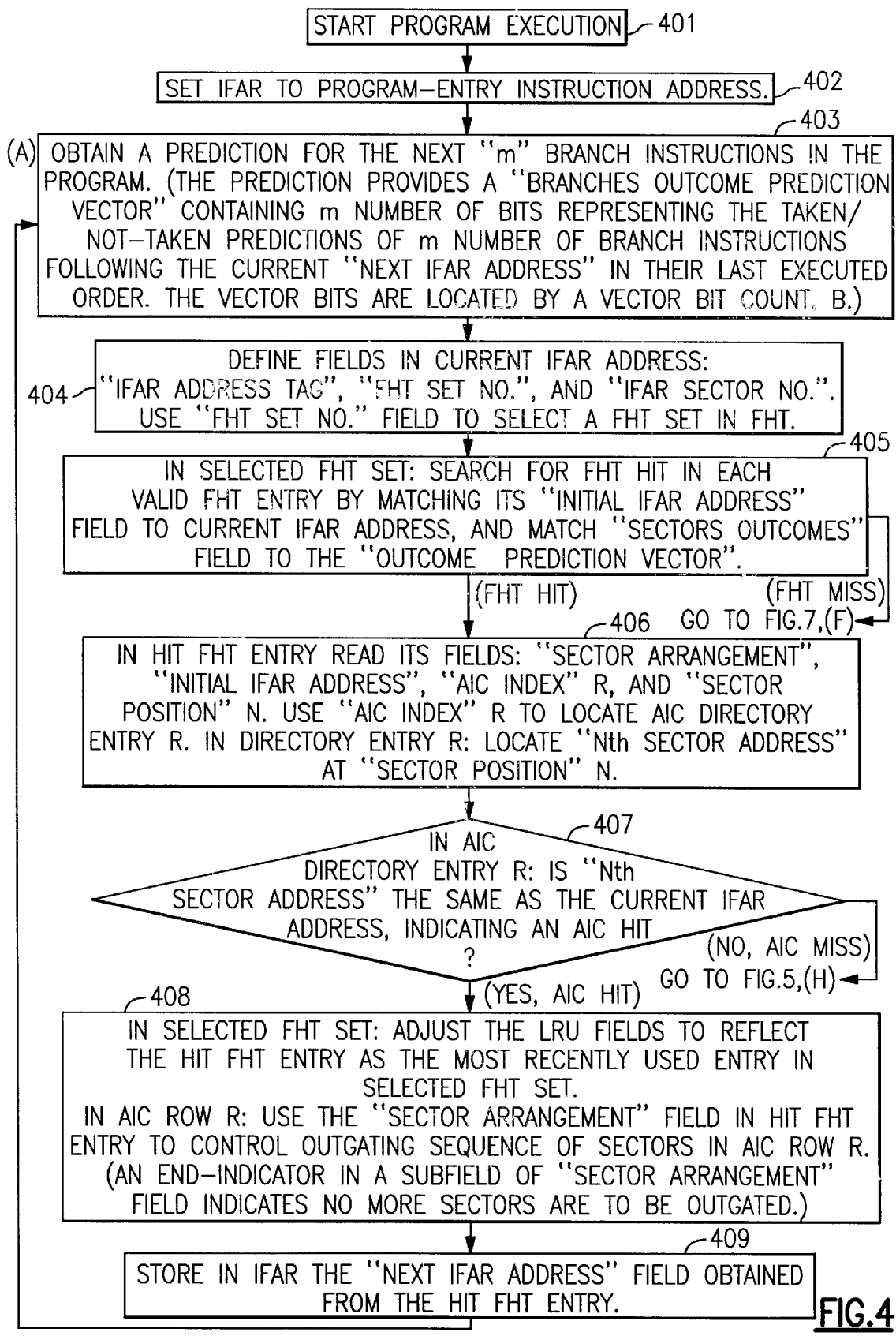

FIG. 4 has the primary path of operations of the embodiment. These operations are performed by a processor in a computer system while the processor is executing a program. The first operation 401 is performed when the processor starts execution of the program, and in operation 402 loads the address of the first instruction of the program into the processor's Instruction Fetch Address Register (IFAR). The type of addresses being used are determined by the architecture of the processor, the choices of program modes allowed by the architecture, and the setting of a program mode in the processor. The program addresses are generally expected to be virtual addresses, but they may be a real or absolute addresses. The embodiment described herein is assumed to be a program containing virtual addresses. Thus in step 402, IFAR receives the first virtual address of the program, and address translation is assumed to be performed by the processor in the usual manner, which is transparent to the program and to the operations of this invention.

The processor then enters operation 403, which is the first operation of a primary loop in the embodiment, in which a FHT cycle is performed. Operation 403 makes a "prediction" on the execution result for each of the next m number of branch instructions in the program following the instruction address currently in the IFAR. The predicted execution result for each of these m branch instructions indicates whether its execution results in a branch taken or not taken. If "taken", the execution path of the program goes to an instruction (generally at a non-sequential instruction address), which is at the branch target address determined by the branch instruction. If "not taken", the execution path of the program goes to the next sequential instruction (at the next sequential instruction address), which is usually determined by adding the length of the current instruction to the address of the branch instruction.

Each prediction is expressed as an "outcomes prediction vector" (prediction vector), which contains m number of bits respectively representing m number of consecutively executed branch instructions in the program. The 1 or 0 state of each bit in the prediction vector indicates whether the program path following the represented branch instruction is the "taken" path or the "not taken" path in the program. Thus, the m bits in the prediction vector respectively represent the m number of branch instructions following the program address currently in IFAR at the start of each FHT cycle. The bits in the prediction vector are located therein by a vector index value B, which is initially set to zero to point to the first (leftmost) bit in the vector, and the last (rightmost) bit is m−1. The program address utilized for each prediction is the IFAR address existing at the beginning of each FHT cycle, and this program address is herein called the "next IFAR address".

Operation 403 obtains the current prediction vector from a prediction unit of the computer system, and starts a "FHT cycle". Each FHT cycle determines either a FHT hit or FHT miss. A FHT hit indicates a FHT entry is found having fields matching both the current prediction vector and "next IFAR address". A FHT miss indicates no FHT entry has been found having fields matching both the current prediction vector and "next IFAR address".

In this invention, the AIC is not examined for any AIC hit or AIC miss until after a FHT hit or FHT miss has been determined. The fastest and shortest path through a FHT cycle occurs when both a FHT hit and AIC hit occur. This fastest primary path is a loop entirely found in FIG. 4.

The FHT hit/miss determination begins when operation 404 is entered. In operation 404 the "IFAR set number" field in the current "next IFAR address" is obtained, and then operation 404 uses it as an index from the beginning of the FHT to select an FHT set therein. The selected FHT set contains FT number of FHT entries. Operation 405 then searches the FHT entries in the selected FHT set to determine if any of the FHT entries in the FHT set matches both the current "prediction vector" and "next IFAR address". If any FHT entry in the set is found to have a match on both of the current "prediction vector" and "next IFAR address", an FHT hit is thereby determined, and operation 406 is entered. If no FHT entry in the set is found to match, a FHT miss is thereby determined, and the process then goes to operation 701 in FIG. 7.

However, the prediction vector provided herein (which is matched with a "branches outcomes" sub-field to determine a FHT hit) only contains bits representing branch instructions, and no vector contains any information regarding a sector not containing any branch instruction. To obtain an accurate vector matching process, it is necessary to use sector "no-branch" information, since such sectors cannot be matched with any of the bits in the vector. Therefore, the vector matching process is complicated by having to contend with "no-branch" indications in some or all of the sub-fields in the "sector branches outcome" field in the same FHT entry.

That is, during the vector matching process, the "outcomes" sub-fields are being accessed in left-to-right order in each "sector branches outcome" field in the same FHT set, and each sub-field in the "branches outcomes" field indicates one of three states (taken, not-taken, or no-branch). Also the prediction vector bits are being matched in left-to-right order on a one-to-one basis with the "outcomes" sub-fields. Any next accessed "outcomes" sub-field may indicate a sector that contains a "no-branch" indicator, and it is ignored in the vector matching process, during which the currently accessed vector bit skips over the "no-branch" indicating "outcomes" sub-field and is matched only with the next accessed "outcomes" sub-field indicating a "branch" (taken or not-taken) state. An "outcomes" field match occurs when all of its sub-fields (up to any end-indicating sub-field, or to the end of the field if no end indicating sub-field exists therein) are either matched with a respective vector bit, or are skipped because of being a "no-branch" sub-field. The match occurs even though all or some bits in the vector did not get matched to any sub-field.

Each "m" prediction vector generation is preferably based on the last execution of the same branch instruction in the program, which may have been done using conventional branch instruction techniques for which a storing occurred of the branch taken or not taken result of the last execution of the respective branch instruction. A bit index, B, is used to locate the position of each bit in the prediction vector. For example when "m" is 4, the first bit in the vector has an index of B=0. and the last bit in the vector has an index of B=3, wherein the last vector bit may be indicated as B=(m−1). Each branch instruction in any "m" prediction represents the end of a basic block in the execution sequence of the program. Thus the 0 or 1 value of each bit in the prediction vector indicates the not-taken or taken outcome of the branch instruction in an execution sequence of the program. The branch target address provided by the execution of each branch instruction indicates the memory location of the next basic block in the execution sequence of the program. A branch not-taken bit in any prediction vector indicates the first instruction of the next basic block is located in memory at the immediately following address. In this manner, each "m" prediction vector indicates the path most likely to occur in a next execution of the same m number of branch instructions in the program. The location of the first basic block in each "m" prediction is thereby directly determined by the IFAR address, and each of the subsequent basic blocks in the "m" prediction is determined by execution of each of the branch instructions represented in the prediction. In the normal operation of the invention, the "next IFAR address" for each next prediction (after the first prediction) is obtained from each FHT entry at the end of its FHT cycle (by operation 409), and that "next IFAR address" is used as the IFAR address for generating the next prediction vector.

The fastest matching of the vector bits and "outcomes" sub-fields may be done by performing them simultaneously in all FHT entries in the selected FHT set (after aligning the vector bits with the "outcomes" sub-fields). Thus, a FHT hit occurs in an FHT entry only if all fields match in one of the FHT entries of the FHT set. However, the matching process may be done partly in parallel and partly serially with perhaps some loss in processor performance, such as first checking the valid fields in all FHT entries in the FHT set, next doing a parallel check on only the FHT entry(s) surviving the previous checks in the set.

In this embodiment, operation 404 uses the "FHT set number" field (e.g. bits 48–56 in FIG. 2D) of the current IFAR address to locate the associated FHT set in the FHT. The nine bits 48–56 are directly used as an index in the FHT to locate the first FHT entry in the selected FHT set. Then operation 405 is performed on the FHT entries in the selected FHT set to find if any FHT hit exists. A FHT miss has occurs when no FHT hit is found in the selected FHT set. (The described embodiment also assumes the computer memory has a line fetch size of 128 bytes used for fetching instructions and data in the computer memory. Thus, 32 instructions of 4 bytes each may be contained in the 128 byte line. In this example, address bits 57–61 in each 64 bit memory address locate any 4 byte instruction in any 128 byte fetched line.)

When operation 405 finds a FHT hit, the hit FHT entry controls the selection in the processor of its next sequence of basic blocks to be executed for the program. If no valid FHT entry is found for the current prediction by operation 403 (FHT miss), the current FHT cycle utilizes the operations in FIGS. 7–9 to generate a FHT entry while the process utilizes conventional branch instruction sequencing to fetch required instructions either from the AIC (if an AIC hit occurs) or from the computer storage hierarchy (if an AIC miss occurs).

In summary, a FHT hit finds a valid FHT entry in an accessed FHT set. The hit FHT entry specifies a sequence of AIC sectors in an AIC row also specified in the hit FHT entry. If that specified AIC row has an AIC hit, the hit FHT entry controls the outgating of a sector sequence from the hit AIC row. If an AIC miss occurs, the hit FHT entry's specified. sequence of sectors is instead fetched from the computer storage hierarchy and concurrently loaded into that AIC row (after the AIC sector contents are invalidated), and sent in the specified order to the processor execution pipeline. However, if a FHT miss occurs in the FHT cycle, the process generates a FHT entry by initiating conventional branch instruction sequencing during the FHT generation process, during which (if an AIC hit occurs during the FHT cycle) a sequence of AIC sectors in a hit AIC row are selected and outgated for execution while. the conventionally generated sequence is specified in the FHT entry being generated. If an AIC miss occurs, the specified sequence of sectors is instead fetched from the computer storage hierarchy and concurrently loaded into the selected AIC row (after the AIC sector contents are invalidated), and sent in the specified order to the processor execution pipeline.

Operation 406 is entered when operation 405 finds an FHT hit. Operation 406 obtains the following fields from the hit FHT entry: "sector arrangements" field, initial IFAR address" field, "AIC index" field, and "sector position" field.

Then operation 407 uses the value in the "AIC index" field (obtained from the hit FHT entry) to accesses an AIC directory entry, in which a "sector address" is accessed at a sector position indicated in the "sector position" field (obtained from the hit FHT entry). An "AIC hit" is determined if the accessed AIC "sector address" matches the current IFAR address, and the next operation 408 is performed. An AIC address match confirms that the accessed AIC sector correctly contains (as its first instruction) the next instruction required by the program, which is at the sector position specified by the hit FHT entry; and this is verification that the sector sequence specified in the hit FHT entry can then be outgated. (In this embodiment, the instruction address comprises the 62 bits (0–61) in FIG. 2D, and bits 62 and 63 in this byte address are always zeros in this embodiment due to all of its instructions having a 4 byte size.)

Figure 5:
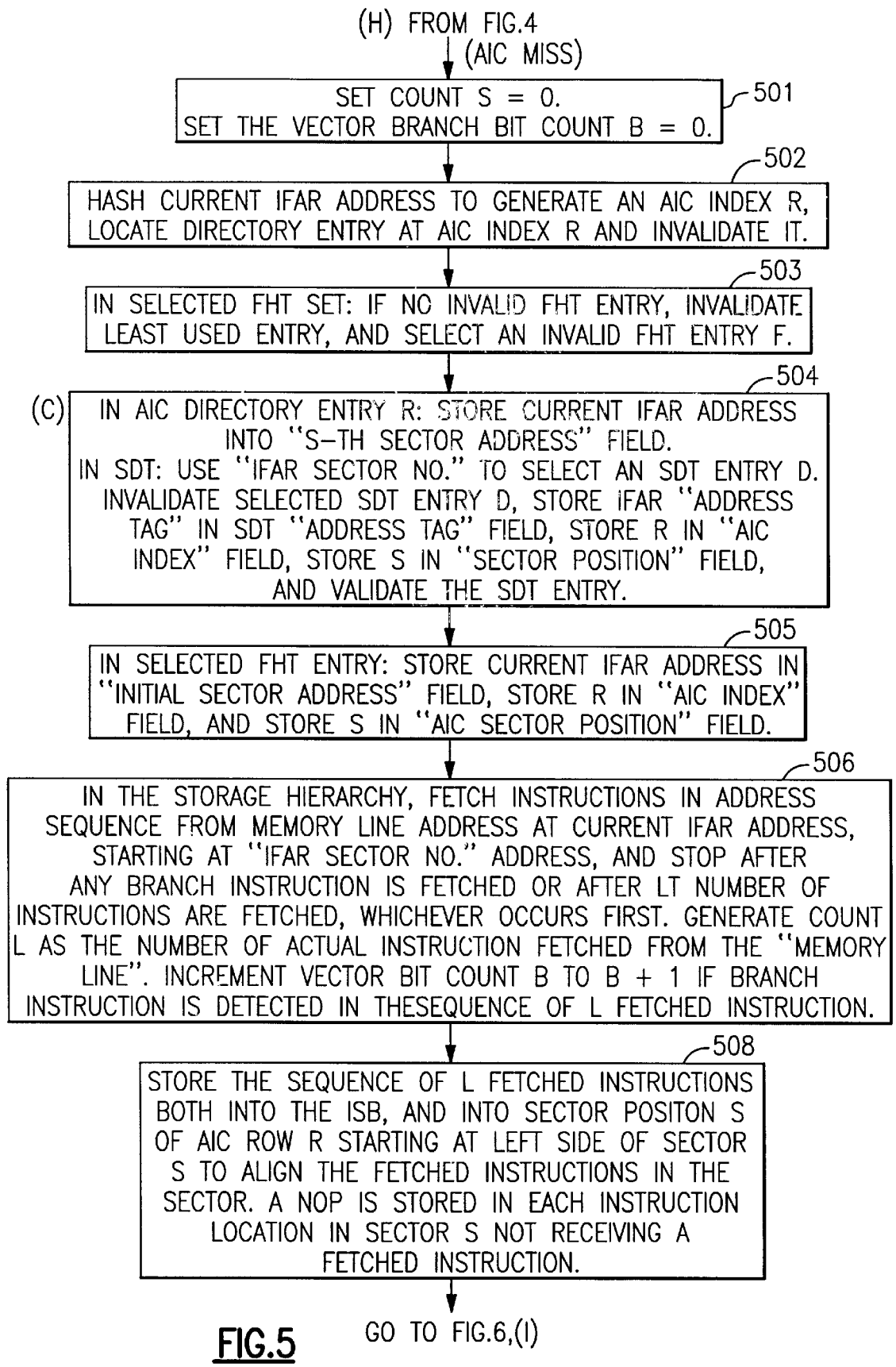

But if these fields mismatch, an "AIC miss" is determined, and the process goes to the next operation 501 in FIG. 5 at entry point (h) for the AIC miss subprocess.

Operation 408 is entered when operation 407 determines an AIC hit. Operation 408 adjusts the LRU fields in the hit FHT entry and in any other valid FHT entries of the same set to reflect that the hit FHT entry is the most recently used entry in the FHT set.

Also, operation 408 outgates from the hit AIC row (located at the AIC index in the hit FHT entry) the sector sequence specified by the "sector arrangements" field in the hit FHT entry. The FHT entry's "sector arrangement" field is capable of indicating any sequence of sectors within the selected AIC row. The specified sequence is indicated in the left-to-right order of the sub-fields in the hit FHT entry's "sector arrangement" field, and any sub-field may indicate any sector in the AIC row, or may contain an end-indicator. A sector identifier number stored in the accessed "sector indicator" sub-field is used to select and outgate the indicated sector in the currently selected AIC row in the order. The outgated sectors send their contained instructions to ISB 18, which feeds the processor's execution-pipeline. Thus, this FHT-sequenced sector outgating from the selected AIC row enables the sectors selected in the AIC row to be outputted for execution in any sector order. Sector outgating stops when an end-indicating special character is reached in scanning the sub-fields of the "sector arrangement" field. In the detailed embodiment, each AIC row has 4 sectors, and three bits are needed for each sector identifier in each sub-field of the "sector arrangement" field to accommodate four sector identifiers and an end-identifier.

Next, operation 409 stores into IFAR the content of the "next IFAR address" field in the hit FHT entry. This completes the primary process loop when both a FHT hit and an AIC hit are obtained.

Then, the operation loops back to entry point (A) in FIG. 4 to begin the next FHT cycle, in which operation 403 is repeated by obtaining the next prediction comprising the "next IFAR address" (provided by the last FHT cycle), and the next m branch prediction vector (provided from the prediction unit). The FHT cycle looping enables the process to continue throughout the execution of a program, although any FHT cycle may have either a FHT hit or miss, and either an AIC hit or miss.

During any FHT cycle having a FHT hit, the selected AIC row may have all or less than all of its sectors outgated in any sequence under control of the "sector arrangement" field, including as little as a single sector (which may be any sector in the AIC row). No further sector is outgated for a hit FHT entry when an end indicating special code is reached in any sub-field of the "sector arrangement" field. In the detailed embodiment, the character "4" is used as the sequence ending indicator.

Accordingly, the program execution sequence specified by each FHT entry is continued to another FHT entry by each FHT entry containing a "next IFAR address", which is the memory address of the next instruction following the program sequence specified by the FHT entry. This enables continuous control of program execution from one FHT entry to a next FHT entry, as long as each next valid FHT entry can be found by the current prediction vector in the FHT. And, this invention operates fastest when successive FHT hits and AIC hits occur in consecutive FHT cycles. The result is this invention can speed up the execution rate of instructions beyond the previous maximum rate of a processor. by eliminating the wait for obtaining the target instructions of branch instruction.

FHT MISS OPERATIONS

Figure 6:
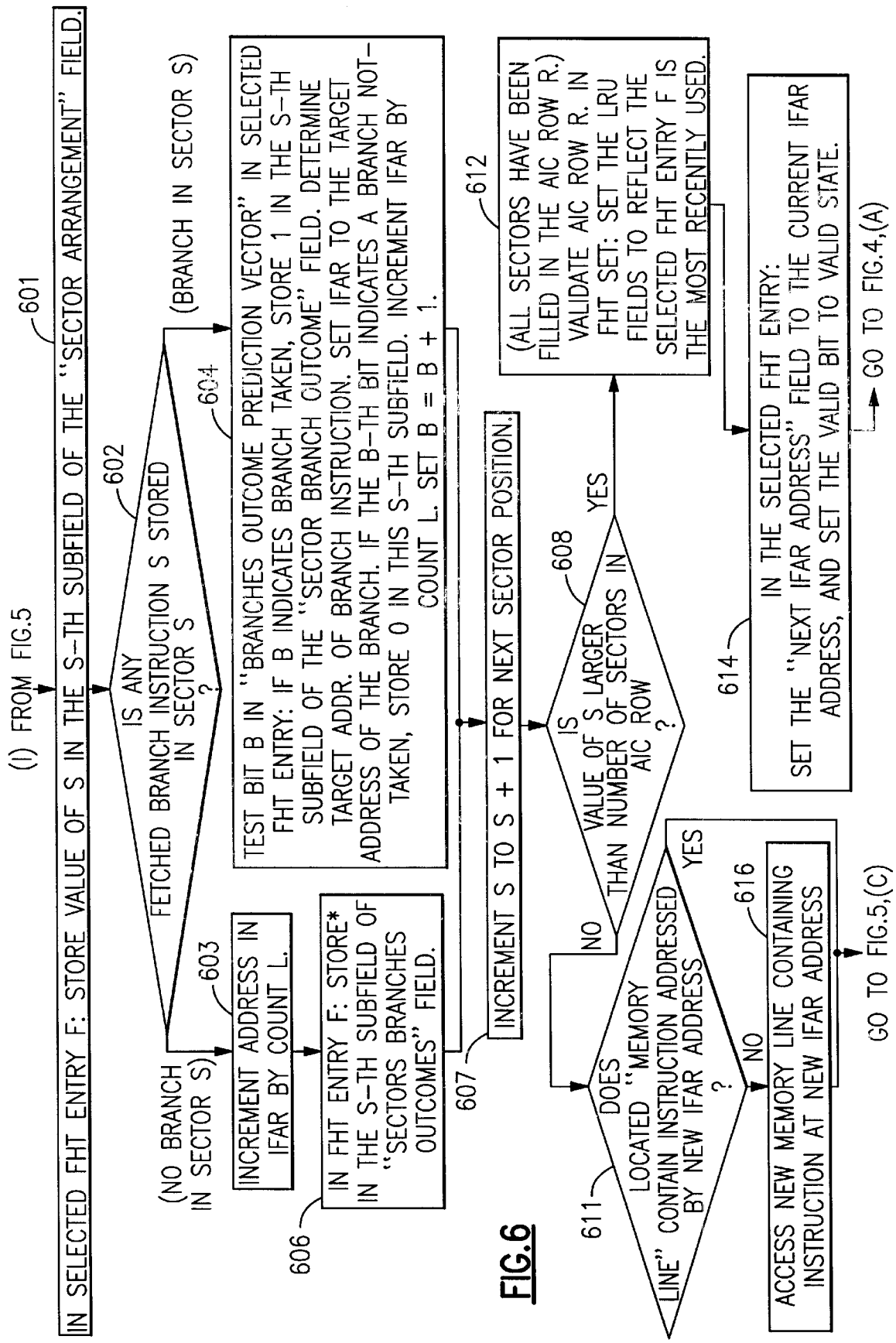
Figure 7:
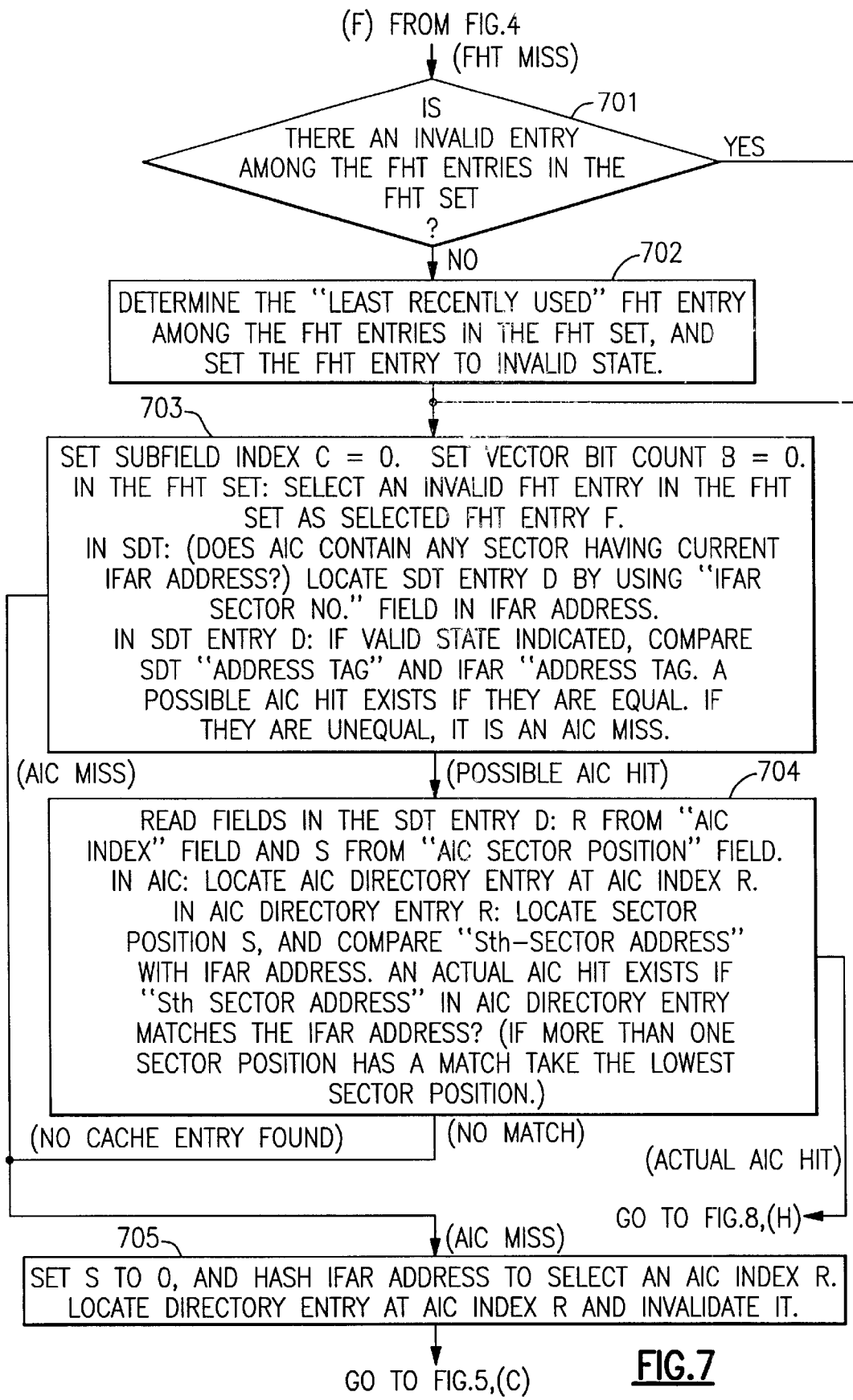
Figure 8:
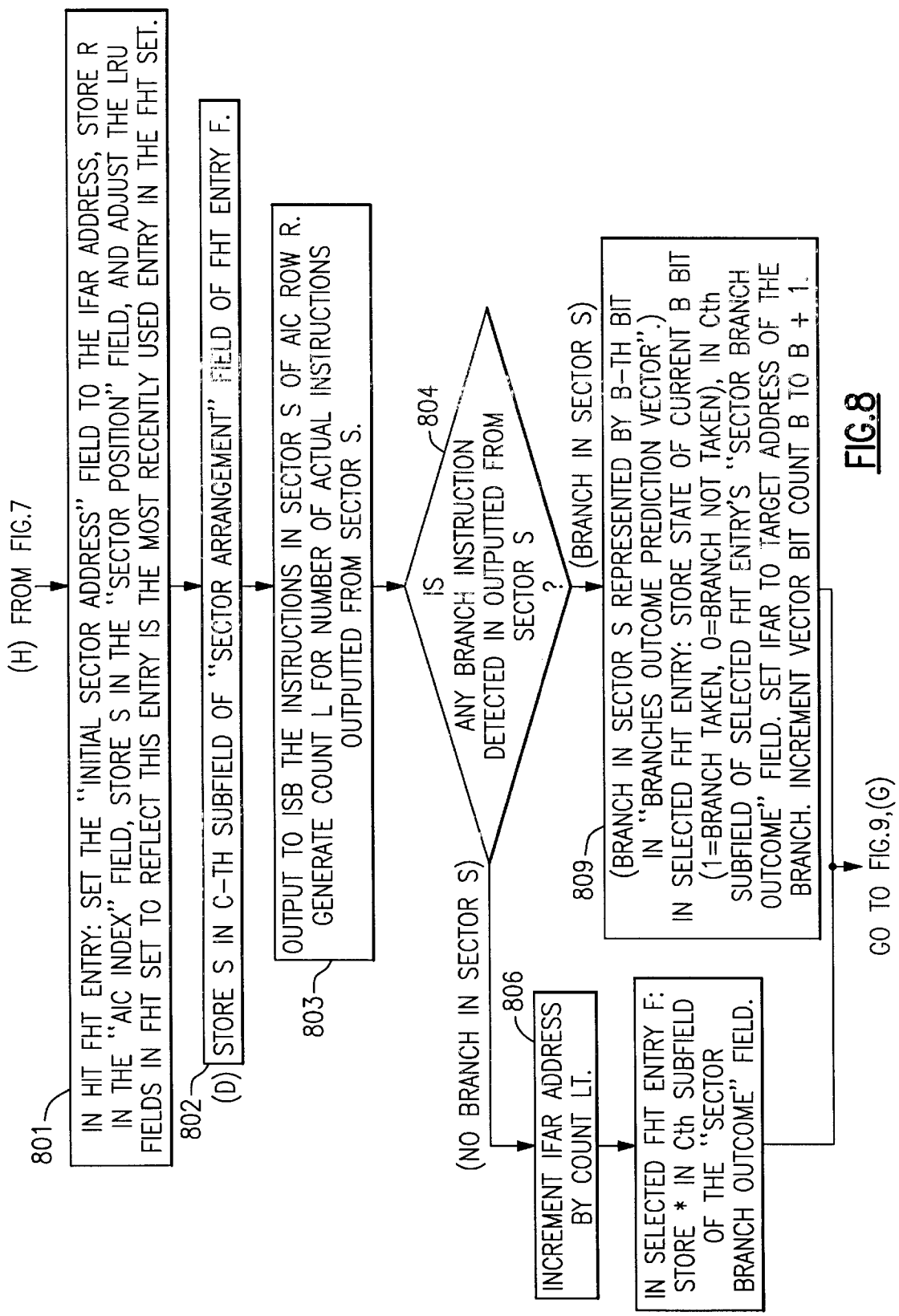
Figure 9:
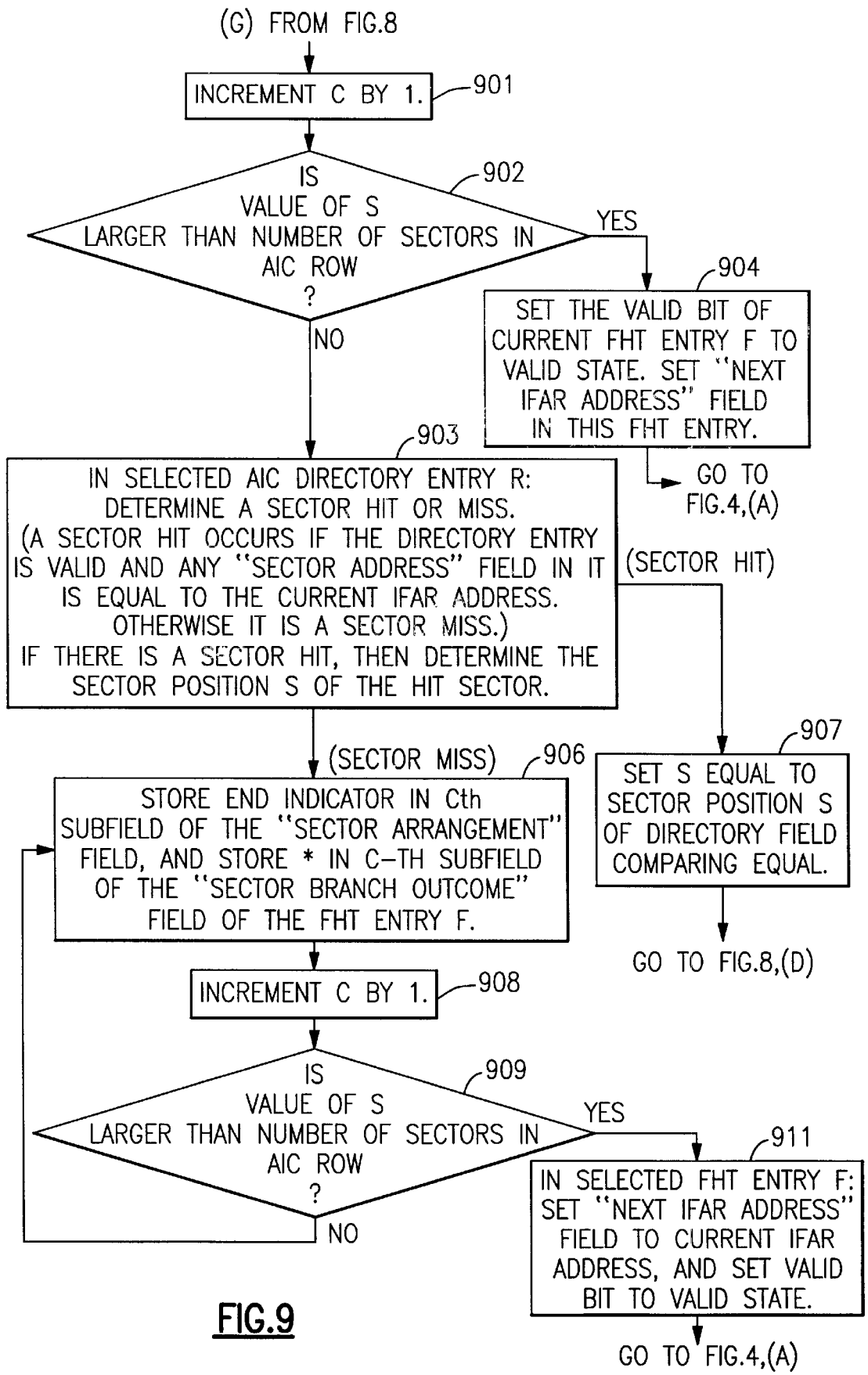

Eventually in FIG. 4, operation 405 will have a FHT miss or operation 407 will have an AIC miss. The process for handling FHT miss operations is shown in FIGS. 7, 8 and 9. The process for handling FHT miss operations will generate a new FHT entry in the associated FHT set, and it may or may not involve an AIC miss. The process for handling AIC miss operations is shown in FIGS. 5 and 6, and it may be invoked by operations in either FIGS. 4 or 7, The process in FIG. 4 enables the FHT to maintain continuous FHT control over program execution by looping back to operation 403 to begin each next FHT cycle, until the process incurs an FHT miss, which starts the novel process herein disclosed in FIGS. 7–9 for controlling the program-execution in a manner that generates a new FHT entry while utilizing conventional branch instruction execution in the generation process. The conventional branch processing obtains the required sequence of instructions for the sectors of one a selected AIC row while generating a new FHT entry representing the executed sequence. If the novel FHT miss process in FIGS. 7–9 cannot find the program-required instructions in any AIC row, the process in FIGS. 5 and 6 is invoked to continue the program execution by fetching the required instructions from the computer memory and loading them into the sectors of a selected AIC row for the new FHT entry to be generated.

The FHT miss operations in FIG. 7 generate a new FHT entry when operation 701 is entered from operation 405 in FIG. 4. Operation 701 in FIG. 7 searches the associated FHT set for an invalid FHT entry, and if none is found step 702 finds a least recently used (LRU) entry in the set and invalidates it, so that it may be selected as the new FHT entry to be generated during this FHT cycle. If more than one invalid FHT entry exist in the FHT set, any of them may be selected. A round-robin selection technique may be used among plural invalid entries.

Operation 703 re-sets both the prediction vector index B, and the sub-field index C to zero in preparation for their use during the current FHT cycle. Also, operation 703 designates the selected invalid entry as the "selected FHT entry F" for the current FHT cycle. Further, operation 703 locates an SDT entry associated with the first sector to be written in the new FHT entry. The SDT entry D is located by using the "IFAR sector number" field in the "next IFAR address" being used by the current FHT cycle, which is shown in FIG. 2D, wherein the . "IFAR sector number" field is used as an index in the SDT. FIG. 2C illustrates the content of each SDT entry. The valid bit of the accessed SDT entry D is tested, and if valid, its "address tag" field is compared with bits 28 to 48 in the current "next IFAR address". If they match, an association is established between the current "next IFAR address" and this SDT entry. However this verified association only indicates a "possible AIC hit", because this valid SDT entry may no longer represent any sector in the AIC row R indicated by this SDT entry if the sectors in that row R were recently replaced.

If operation 703 indicates a "possible AIC hit", then operation 704 is entered, and it reads the "AIC index R" and "sector position" fields from the SDT entry D for determining if SDT entry D actually represents the current "next IFAR address". Then, the AIC directory entry at the "AIC index" R (indicated in the "AIC index" field in this SDT entry) is located, and its 62 bit "sector address" field is read from the sector position of the AIC directory entry R at the "sector position" indicated in the SDT entry D. Then this AIC sector address is compared to bits 0 to 61 in the current IFAR address. If they match, an AIC hit is determined, and then the processing goes to FIG. 8 at entry point H. But if they mis-match an AIC miss is determined, and the processing goes to operation 705.

When operation 705 is entered, an AIC miss has been determined by either operation 703 or 704. S is set to 0 and the AIC index R corresponding to the IFAR address is determined. The AIC directory entry at AIC index R is located and invalidated. The AIC miss processing also requires invalidation of each SDT entry associated with a valid AIC sector in the identified AIC row R. This is done is step 504. When operation 705 is completed, and the process enters FIG. 5 at entry point C for processing the AIC miss.

If operation 704 finds an actual "AIC hit", FIG. 8 is entered, and its operations are performed. The process In FIGS. 8 and 9 generate a new FHT entry in the selected FHT entry in the associated FHT set (i.e. associated with the AIC row R located by the "AIC index" field in the associated SDT entry). The processing stores in this new FHT entry the next executed instruction sequence in the program, which ends when all of the sectors have received instructions in an execution path determined by conventional processing of its branch instructions.

In FIG. 8, operation 801 accesses the new FHT entry F (currently in invalid state) and stores into its "initial sector address" field the address value in bits 0–61 of the current IFAR address. Then, the LRU fields in its FHT set are adjusted to reflect that this FHT entry is the most recently used entry.

Next operation 802 accesses sub-field C in the "sector arrangement" field, and stores S therein. When C is initially 0, it is the first (leftmost) sub-field in the "sector arrangement" field. The value of S is indicated by the "AIC index" and "sector position" fields in the associated SDT entry. The value of S for the first (and for any other) sub-field, in the "sector arrangement" field may be for any sector position in the AIC row. The next operation 802 stores the value of S into the current sub-field (at sub field index C) in the FHT entry being generated.

Then operation 803 outputs to ISB (instruction sequence buffer) 18 in FIG. 1 the instructions in the selected AIC sector S, and generates a count L of the actual number of instructions are being outputted from sector S. These instructions may be outputted from the selected sector either serially or in parallel, or in any serial/parallel combination, as long as the order of the instructions put into ISB 18 is the order existing in the AIC sector. A serial outputting for operation 803 starts with an initial count L of zero and increments L by one for each instruction outgated to ISB 18, so that the final count L for sector S indicates the number of instructions outgated to the ISB 18 from sector S in the current AIC row R. The outgating stops whenever an end-indicator is encountered in an "outcomes" sub-field or the maximum instruction count ST is reached, whichever occurs first.

Operation 804 detects whether any branch instruction exists in sector S. If no branch is detected in sector S, operation 806 is entered. If a branch instruction is detected operation 809 is instead entered.

Operation 806 increments the IFAR address by count LT (the maximum instruction count in sector S) when no branch is detected for sector S. The IFAR address will indicate the address for the next sequentially located instruction as the first instruction for the next sector expected to provide instructions for execution. This block continuation into a next sector is indicated by storing a special character (here a "2" or an asterisk") into the C-th sub-field of the "sector branch outcome" field in the, same FHT entry F. Then, the process goes to FIG. 9 entry point (G) to complete the generation of the selected FHT entry F.

However if operation 809 is entered because a branch is detected in operation 804, the predicted type of branch operation needs to be stored in the C-th sub-field of the "sector branch outcome" field in the same FHT entry F. The predicted type of branch operation is determined by the state of the Bth vector bit (which represents the branch instruction in sector S) The branch state is either 0 or 1 for indicating if it is not-taken or taken, respectively. If Bit B indicates the not-taken state (0), a zero is stored in this Cth sub-field. If Bit B indicates the taken state (1), a one is stored in this Cth sub-field. Then, B is incremented by one to locate the next vector bit. The IFAR is incremented by the actual count L of the number of instructions in sector S (which may be from 1 to LT).

In FIG. 9, operation 901 is entered, and it increments the sub-field index C by one to locate the next corresponding sub-field in each of the "sector arrangement" and "sector outcomes" fields.

Then, operation 902 tests the incremented value of C to determined if it has reached an end value which would indicate it has incremented beyond the last sub-field. (In the detailed embodiment herein, the sectors are 0 through 3, and 4 is used as an end-indicator. In that case, if S reaches 4, then S is larger than the maximum number of sectors.). If it has incremented beyond the last sub-field, operation 904 is entered. Operation 904 sets: the valid bit of the FHT entry being generated to indicate the valid state, and the "next IFAR address" field is set to the current instruction address in IFAR. The generation of FHT entry F is now compete, and the process returns to FIG. 4 at entry point (A) for starting the next FHT cycle.

However if operation 902 found C has not exceeded the last sector, then C points to a usable sub-field, and then operation 903 is performed. Operation 903 determines if any AIC sector hit exists in the current AIC row R and AIC directory entry for the current IFAR address. This is done in the AIC directory entry at the current index R by comparing the current IFAR address to each "S-sector address" until either a match is obtained and its sector position is determined, or no match is found in the AIC directory entry. This is done by the preferred embodiment shown in FIG. 1, in which a comparator is provided at an output of each "sector address" column in the AIC directory. The currently selected AIC directory entry 22 has all of its "sector addresses" outputted respectively to the comparators in FIG. 1. Each of the comparators compares its respective "sector address" with the current IFAR address provided from IFAR 16. Then, each comparator provides an output to a respective AND gate which also receives a valid output from the selected AIC directory entry 22, and each of the AND gates provides a respective output of the set C0, C1, C2 or C3 for indicate the respective "sector position". A "sector hit" requires at least one of the sector addresses to be equal to the current IFAR address. If more than one sector position has equality, the leftmost of the equal sector positions is indicated as the hit sector position. The hit sector position is the current value of S.

If a "sector hit" is obtained, operation 907 is next performed. Operation 907 either: 1) sets the current value of S equal to the value of S in the "sector position" field in the associated SDT entry, or 2) sets the current value of S equal to the value of S found for the sector address comparing equal. Then, the process then goes to FIG. 8 entry point (d).

If operation 903 finds no sector address equal to the IFAR address in row R, a "sector miss" is determined, and operation 906 is next performed. Operation 906 stores the end-indicator (e.g. 4) into sub-field C of the "sector arrangement" field to indicate that the last sub-field identified the last sector to be executed for this FHT entry. Operation 906 also stores a "no-branch instruction" indicator (e.g. 2, or an asterisk *) into sub-field C of the corresponding "sector branches outcomes" field to indicate that no branch instruction exists in the corresponding sector. Then, operation 908 increments C by 1, and operation 909 operates (similarly to operation 902) to again test the current C value to determine if all sub-fields have been processed for the FHT entry F. If all sub-fields have been processed (e.g. C equals 4), then in the current FHT entry F, operation 911 (performs like operation 904) to set: the valid bit of the FHT entry to indicate the valid state, and to set its "next IFAR address" field to the current instruction address in IFAR. The generation of FHT entry F is now compete, and the process returns to FIG. 4 at entry point (A) for starting the next FHT cycle.

If operation 903 finds a "sector hit", and operation 906 is next performed.

When operation 907 is performed, the generation process has completed for the current FHT entry, and FIG. 8 is entered at entry point (D) to perform operation 802 for the next sub-field C (incremented by the last performance of operation 901), or which step 903 determined the sector number S for the currently executed sector of instructions, and that value of S is stored by operation 907.

AIC MISS OPERATIONS

An AIC miss causes operation 501 in FIG. 5 to be entered from operation 407 in FIG. 4 or operation 504 to be entered from operation 705 in FIG. 7. Operation 501 is performed by setting count S to zero, and by setting the prediction vector index B to zero. This invention does not require any particular AIC row to be used for any new AIC row being stored with fetched instructions. The method used in the detailed embodiment is represented by operation 502, which selects an AIC index (for selecting a particular AIC row and corresponding AIC directory entry) by hashing the current IFAR address bits selected in the range from bit position 0 to bit position 57. The corresponding AIC directory entry R is invalidated. Next operation 503 selects the FHT set by using the "IFAR set number" field in the current "next IFAR address" as an index in the FHT. An invalid FHT entry is selected in the FHT set, and if no invalid entry exists the least recently used entry is determined by the LRU fields in the FHT set, and it is selected.

The next operation 504 accesses the AIC directory entry R at the selected AIC index, and stores into its "Sth sector address" field the current IFAR address. Operation 504 also uses the "IFAR sector number" field of the current "next IFAR address" to select a "sector distribution table" (SDT) entry. There is more than one way to perform operation 504. A simple way is shown in operation 504 in FIG. 5, and a more complex way is shown in FIG. 10.

In operation 504 in the process of FIG. 5, the selected SDT entry is always invalidated, and then the SDT entry has written into its fields: the "address tag" of the current IFAR address, the hash-determined "AIC index", and S in its "sector position" to locate the current sector in the selected AIC row. Then this SDT entry is validated.

Figure 10:
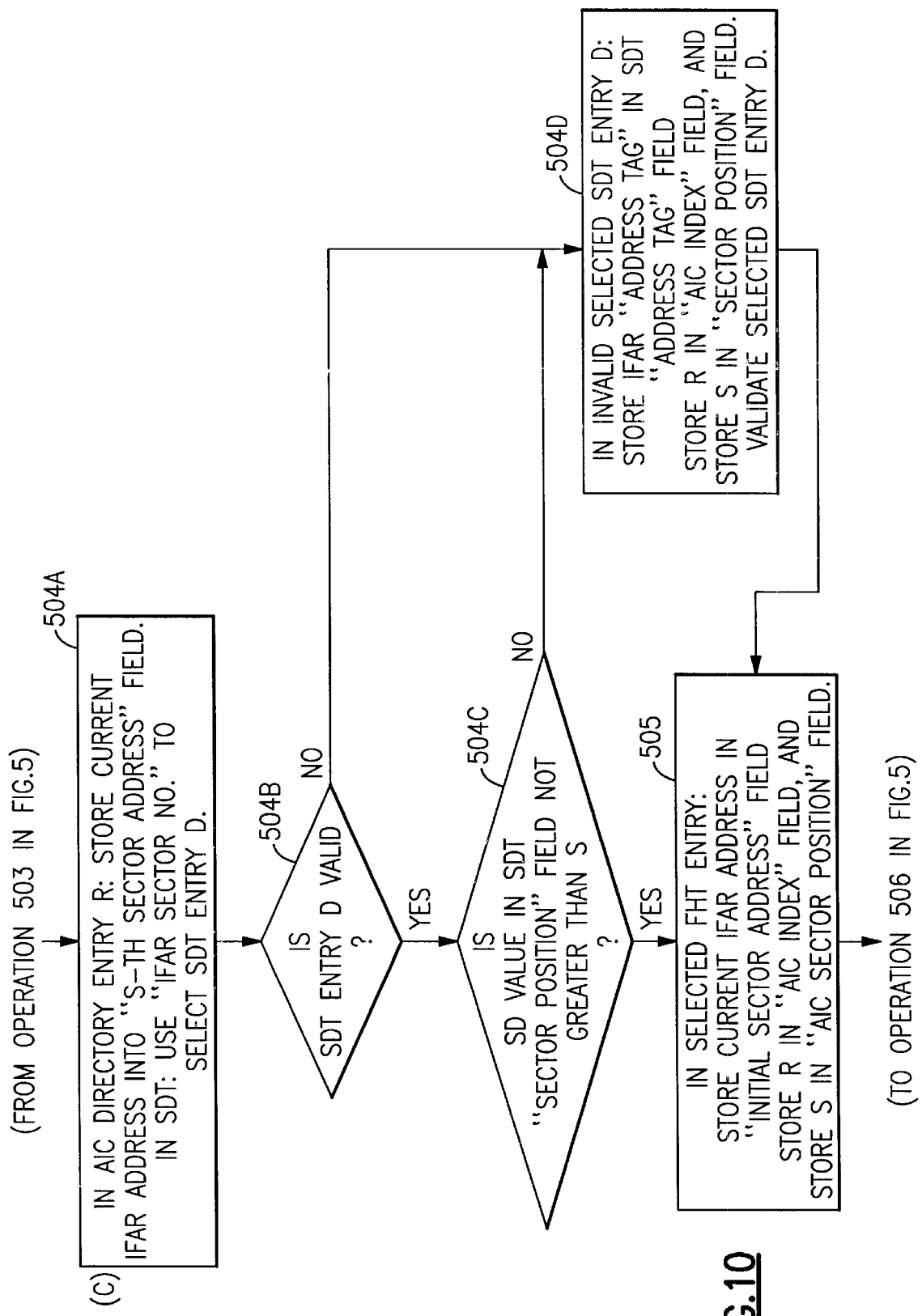

However instead of operation 504, FIG. 10 shows alternative SDT operations. In FIG. 10, the operations for the AIC directory entry R are the same as explained for operation 504 in FIG. 5. But in FIG. 10, operations 504B, 504C and 504D provide a different process for handling the selected SDT entry. Operation 504B determines if the SDT entry (located at the "IFAR sector number" index in the SDT) is found to be in the valid state when accessed. If valid, operation 504D is performed, and if not valid operation 504C is performed.

But when found valid, operation 504C tests the SD value in the SDT "sector position" field to determine if it is not greater than the current S sector position value. If the SDT "sector position" value, DS, is not greater than S, the yes exit is taken to operation 505, and the SDT entry is not invalidated. Then this SDT entry is not be changed to represent the current sector being provided in the AIC row (as would have been done by operation 504 in FIG. 5). Instead, this SDT entry will remain unchanged to represent a lower numbered sector position in another AIC row, because it is more likely that the lower numbered sector position will be needed for the generation of a future FHT entry (probably in a different FHT set) specifying a different sequence for the same AIC row.

If the SDT entry is found invalid by operation 504B, or if operation 504C finds the SDT "sector position" field is greater than S, this SDT entry is invalidated and its fields are changed, so that it can represent the current sector S in the FHT entry now being generated. In essence, operation 504D performs the same SDT operation done by the SDT operation in 504 of FIG. 5. Operation 504D stores the IFAR "address tag" field into the "address tag" field in the SDT entry, and stores the hash-determined "AIC index" and current value of S, respectively, into the SDT "address tag" and "sector position" fields.

Thus, if the found SDT entry is valid, and the segment SD is at a lower sector position than S, it is believed likely to have a greater possibility of use than if the segment position is at a higher sector position. This is based on a likelihood that lower sector positions are more likely to be specified in a future FHT entry than higher sector positions.

Then the next operation 505 (identical in FIG. 5 and 10) stores into the selected FHT entry: the current IFAR address is stored in its "initial IFAR address" field, R is stored into its "AIC index" field, and S is stored into its "sector position" field.

The next operation 506 uses the current IFAR address to locate a line in the memory storage hierarchy, and the processor sequentially-fetches instructions from that line until either a branch instruction is reached or until LT number of instructions are fetched to fill a sector, which ever occurs first. LT=8 in the detailed embodiment. Operation 506 also generates a count L of the number of instructions stored into sector S. Also, if a branch instruction is detected in the sector, the vector index B is incremented by one (B=B+1). instructions stored into sector S. Also, if a branch instruction is detected in the sector, the vector index B is incremented by one (B=B+1).

Then, operation 508 stores this sequence of fetched instructions both in the ISB 18 in FIG. 1, and into the Sth sector of row R starting at the left instruction position in the sector to align the instructions in each sector with its left edge. A NOP (no operation) code is stored in each instruction position in the Sth sector to pad any non-stored instruction positions to the right of any branch instruction written in the Sth sector. The NOPs are preferable initially written in all rows of the AIC when initializing the process of this invention, and then any unfilled instruction positions in any sector automatically contains NOPs.

The processing then goes to entry point (I) in FIG. 6 after operation 508 is completed, and operation 601 is performed. Operation 601 stores the value of S into the S-th sub-field of the "sector arrangement" field in the selected FHT entry F. Then operation 602 tests if any branch instruction is indicated to be in sector S. If no branch instruction exists in sector S, operation 603 is performed. If a branch instruction exists in sector S, operation 604 is performed.

If operation 603 is performed when no branch exists in the sector, and it increments the IFAR address by L instruction lengths to the address for the first instruction in the next sector. Count L is the count obtained in operation 506. The next sector is in the current AIC row R, unless the current sector S is the last sector in the current AIC row in which case the incremented IFAR address locates the first instruction in the next sector of another AIC row, and this incremented IFAR address is later placed by operation 614 into the "next IFAR address" field of the current FHT entry being generated to lead the processing to that sector in another AIC row . . . The next operation 606 stores a into the S-th sub-field of the Then operation 607 is performed which increments the value of S by 1 (S=S+1).

Operation 604 is performed when operation 602 indicates a branch instruction has been determined to exist in sector S. Operation 604 tests the state of the current B-th bit in the prediction vector to detect whether this branch instruction is predicted to have a branch-taken or not-taken outcome during execution of the instructions in the current Sth sector. This is done by operation 604 testing the state of the bit at index B and storing its state (0 or 1) in the S-th sub-field of the "sectors branches outcomes" field in the FHT entry being generated. Then, B is incremented by one (B=B+1) to point to the next bit in the prediction vector (for use by the next sector containing a branch instruction). And, the IFAR address is incremented by count L (which was previously determined by operation 506).

Then, operation 607 is performed, which increments the value of S by one (S=S+1) to make S point to any next sector in AIC row R. Then operation 608 tests the incremented value of S to determine if it has exceeded the last sector number in row R. In the detailed embodiment, each AIC row in the described embodiment has four sectors (which are numbered as sectors 0, 1, 2 and 3); so that if S is incremented to a number less than 4 then S represents an existing sector and operation 608 takes its no exit to operation 611. But if S is found by operation 608 to have the value 4, it indicates all sectors in the AIC row have been filled, and the yes exit is taken to operation 612.

If operation 611 is entered, it uses the new IFAR address (provided by operation 603 or 604) to locate and fetch the next sequence of instructions for the next sector at the new sector position S (which was determined by operation 607).

Since the currently accessed line is immediately available to the processor, and the next instructions for sector S may be contained in this line, it is the first line to be examined by operation 611 to determine if it contains an instruction addressed by the current IFAR address. If it contains the instruction currently address by IFAR, the yes exit is taken to entry (C) in FIG. 5 where operation 504 is performed for sector S (now the next sector).

If operation 611 finds the new IFAR address (provided by operation 603 or 604) does not address any instruction in the currently accessed line, operation 616 is entered to access a new memory line from the storage hierarchy using the current IFAR address. This new line will contain the next instruction(s) for the current sector S. Then the process goes to entry (C) in FIG. 5 where operation 504 is performed for sector S (now the next sector).

It may now be apparent that the exit from FIG. 6 to entry point C on FIG. 5 provides an operational loop which iterates once for each sector being stored in the current AIC row R while the current FHT entry is being generated. Eventually during this looping, operation 608 will detect that all sectors have been stored for the current AIC row R, and then operation 608 will take its yes exit to operation 612 for completing the generation of the current FHT entry. Operation 612 sets the LRU fields in the FHT set to reflect that the current FHT entry being generated is the most recently used FHT entry. Then operation 614 completes the FHT entry by setting the current IFAR address (for the next instruction) into the "next IFAR address" field of the FHT entry being generated. Finally, operation 614 sets on the valid bit to indicate the valid state for the FHT entry. The process then goes to entry point (A) in FIG. 4 to start the next FHT cycle.

When a program starts, initially an AIC miss will occur for the first FHT cycle hashing to a new AIC row to generate the first FHT entry in its FHT set. The first-generated FHT entry of each FHT set has a left-to-right sequence of sub-fields in its "sector arrangement" and "sector branch outcomes" fields which are set up to represent the left-to-right sequence of sectors in the associated AIC row, wherein the first sub-field (leftmost) identifies sector 0 of the associated AIC row, and the other sub-fields: sequentially identify the other sectors in that AIC row. If the first-generated FHT entry is not invalidated, the second and later generated FHT entries in the, same FHT set differ from this first-generated FHT entry by having different sequences of sectors in the associated AIC row. That is, the second and later generated FHT entries in the same FHT set may specify a sector sequence which may start with any sector in the associated AIC row and end with any sector in the associated AIC row. For example, the first-generated entry may always specify an "arrangement" field containing the sequence of sector numbers 0, 1, 2 or 3 in the associated AIC row, and each of the later-generated FHT entries may specify an "arrangement" field containing the sequence of sector numbers 3, 0, 1, 2 or 2, 0, 1 or 1, 3 etc. in the associated AIC row.

It is to be noted that this invention allows the sectors in any instruction cache row be obtained from multiple memory lines, which may be scattered around the storage hierarchy; and therefore this invention has no requirement of sequentiality of instruction locations for its different sectors. Thus, the instructions in each sector in any AIC row may be obtained from the same memory line or may be obtained from different memory lines in the storage hierarchy. This characteristic occurs from the operations 611 and 616 in the AIC miss handling process.

While a program is executing, the AIC sectors are being filled with instructions fetched from the computer's storage hierarchy, while FHT entries are being generated. As the program executes, most (if not all) of the FHT entries in the FHT sets will likely be generated, while most (if not all) of the AIC rows and AIC directory entries will likely be filled with executed instructions in the program. Each of the valid FHT entries will specify an execution sequence for a part of the executing program. The sectors in the valid AIC rows will contain most (if not all) of the instructions of the executing program specified by the valid FHT entries which will represent a history of the program execution.

The execution sequence of the program is predictively determined by the history of the program execution indicated by the valid FHT entries. The predictive process is continuously checked by a concurrent execution of the branch instructions in the program by the branch execution unit 18A and the execution mismatch controls 19 in FIG. 1. Whenever units 18A and 19 indicate a deviation between the predicted execution path and the actual execution path, the predicted path is reset back to the execution target address where the deviation occurred, and the predictive execution is corrected to represent the actual execution, and the predictive execution continues for the program.

Complete flexibility is provided for all FHT entries in each FHT set to avoid any dependency upon the first sector in the associated AIC row for the second and later-generated FHT entries in any FHT set, as occurred in the incorporated specification. Thus, each of the different sequences represented by the FHT entries in any FHT set may start with any sector in the associated AIC row, including starting each of the associated FHT sequences with a different sector in the associated row. It is to be noted in the subject specification that the FHT entries associated with the same AIC row may be in different FHT sets, unlike in the incorporated specification where all FHT entries associated with the same AIC row. are in the same FHT set. Also a given FHT set can have FHT entries associated with different AIC rows.

While I have described the preferred embodiment of my invention, it will be understood that those skilled in the art, both now and in the future, may make various improvements and enhancements which fall within the scope of the claims, which follow. These claims should be construed to maintain the proper protection for the invention first disclosed here

Having thus described my invention, what I claim as new and desire to secure by letters patent is:

1. A processor method for reducing branch instruction overhead during program execution by a processor, comprising performing FHT (fetch history table) cycles for controlling execution of a program by the processor, initiating each FHT cycle with a prediction for an execution path to be followed in the program during the FHT cycle, using the prediction in an attempt to find an FHT entry for controlling program execution during the FHT cycle, indicating a FHT hit for the FHT cycle if an FHT entry is found to match the prediction, and indicating an FHT miss for the FHT cycle if no FHT entry is found to match the prediction, using a FHT entry having a FHT hit to control an outputting of instructions in a sequence of sectors in an AIC row designated by the FHT entry for execution during the FHT cycle, and not using conventional instruction output sequencing controls in the processor during the FHT cycle, and generating a FHT entry during a FHT cycle having a FHT miss while using conventional instruction output sequencing controls in the processor to sequence instructions for execution, and ending use of the conventional instruction output sequencing controls at the end of the FHT cycle.

2. A processor method for reducing branch instruction overhead during program execution by a processor, comprising executing FHT cycles for controlling the sequencing of instructions for processor execution, and providing a prediction for initiating each FHT cycle, initiating each FHT cycle by using a current prediction in an attempt to find a usable FHT entry, indicating a FHT hit when a FHT entry is found to match the prediction, or indicating an FHT miss when no FHT entry is found to match the prediction, specifying in an FHT entry having a FHT hit: an AIC location, a sequence of sectors in an AIC row at the specified AIC location, and an initial sector address for a first-executed sector in the specified sequence of sectors, and specifying a AIC directory address for each sector position in the AIC row, a respective AIC directory address locating a first instruction for a respective sector position in the AIC row, locating the sector position in the AIC row for the first-executed sector in the specified sequence of sectors, and locating a corresponding AIC directory address for the first-executed sector in the specified sequence of sectors, testing to determine if the corresponding AIC directory address in the specified AIC row is equal to a next instruction address indicated by the processor for the program, indicating an AIC hit if the test indicates equality, and indicating an AIC miss if the test indicates inequality, outputting instructions from the AIC row in the sector sequence specified by the FHT entry having a FHT hit for execution by the processor, generating a FHT entry during the FHT cycle having a FHT miss while using conventional instruction output sequencing controls to provide instructions for execution, and providing during the FHT cycle a next instruction address for a next prediction to be used by the next FHT cycle, and the next instruction address being contained in the FHT entry having an FHT hit.

3. A processor method for reducing branch instruction overhead during program execution by a processor as defined in claim 2, further comprising initiating the current FHT cycle with a current prediction using the next instruction address provided by a last FHT cycle, the prediction including the next instruction address and a prediction vector generated from a history of branch instruction executions, taken or not-taken, in the program execution sequence following the next instruction address, the prediction vector being comprised of a sequence of m number of bits representing a sequence of m number of executed branch instructions following the next instruction address, an initial setting of the next instruction address being a program entry address for the program being executed, and locating a FHT set, and searching FHT entries in the FHT set for an FHT entry matching both the next instruction address and the prediction vector, and indicating a FHT hit if a matching FHT entry is found in the FHT set, or indicating a FHT miss if no matching FHT entry is found in the FHT set.

4. A processor method for reducing branch instruction overhead during program execution by a processor as defined in claim 3, further comprising:

specifying a FHT set field in the next instruction address as a set of K number of contiguous bits bounded at its low-order end by a low-order end of a memory line address portion of the next instruction address used by the prediction for the current FHT cycle, and determining the K number of contiguous bits in the set by the size of the FHT, which contains up to $2**K$ number of valid FHT sets, and locating a FHT set by using the value in the FHT set field as an FHT set index in the FHT.

5. A processor method for reducing branch instruction overhead during program execution by a processor as defined in claim 4, further comprising:

accessing in a FHT entry having a FHT hit: an AIC location field for specifying the location of an associated AIC row and AIC directory entry, a sector arrangement field for specifying a sequence of sectors in the associated AIC row, an initial sector address field for containing an address locating a first instruction in the first executed sector in the specified sector sequence, locating an AIC directory entry by using the accessed AIC location field, and locating an AIC sector address in the AIC directory entry at an AIC sector position indicated in the FHT entry for the first-executed sector in the specified sector sequence, comparing the located AIC sector address with a current instruction address for the program indicated by the processor, and indicating an AIC hit if the comparing operation is equal, and indicating an AIC miss if the comparing operation is unequal, accessing instructions from the AIC row in the sequence of sectors specified in the sector arrangement field when an AIC hit is indicated during the FHT cycle having a FHT hit, and accessing instruction from a computer storage hierarchy under conventional instruction sequencing controls in the processor when an AIC miss is indicated, and outputting the accessed instructions for execution by the processor, and accessing a next instruction address field in the FHT entry having a FHT hit and making a contained next instruction address available for a prediction to be made for use by the next FHT cycle.

6. A processor method for reducing branch instruction overhead during program execution by a processor as defined in claim 5, further comprising:

adjusting a replacement control field in each FHT entry in the located FHT set to indicate the FHT entry having an FHT hit is the most recently used FHT entry in the FHT set.

7. A processor method for reducing branch instruction overhead during program execution by a processor as defined in claim 4, further comprising:

a matching process for the prediction vector starting with an initial bit in the prediction vector which is matched with the state of an initial sub-field in a sectors outcomes field in each valid FHT entry in the located FHT set, selecting a next vector bit after the current bit has a match with the branch state of a sub-field, the next vector bit skipping any sub-field containing a no-branch instruction indication in the sectors outcomes field, and indicating a vector mismatch if any vector bit mismatches with the state of a sub-field containing a branch, instruction state, and indicating a vector match, and ending the matching process, if no vector bit has a mismatch when an end-indicator is detected, or when the matching process has handled the last sub-field in the sector outcomes field with no vector bit mismatch when no end-indicator is detected.

8. A processor method for reducing branch instruction overhead during program execution by a processor as defined in claim 7, for a FHT miss and an AIC hit the process further comprising:

finding an invalid FHT entry in the located FHT set, the process to generate a new FHT entry from the invalid FHT entry, setting a sub-field index to an initial sub-field position in both the arrangement field and the sectors outcomes field in the FHT entry, and setting a vector bit count to an initial bit position in the prediction vector, sector-searching for a sector in any AIC row that contains a valid sector in any sector position having an AIC directory sector address equal to a next instruction being addressed by the processor, indicating an AIC hit if an AIC sector is found by the sector-searching operation in any AIC row, and indicating an AIC miss if no AIC sector is found by the sector-searching operation, in the new FHT entry: setting an initial sector address field to the next instruction address in the processor, setting the AIC location field to an AIC location of an AIC row found by the sector-searching operation to contain the AIC sector, and storing into a sub-field at a current sub-field index in the sector arrangement field the sector position of the AIC sector found by the sector-searching operation, outputting instructions from the AIC sector for processor execution from the currently accessed AIC sector, detecting if any branch instruction exists in the current AIC sector, storing a no-branch indicator into a sub-field at the current sub-field index in a branches sectors outcomes field in the FHT entry if no branch instruction is detected in the AIC sector, or storing the branch state of the prediction vector bit located at a current vector bit count into the sub-field in the sectors outcomes field when a branch instruction is detected in the AIC sector, incrementing the current sector position locator to represent the next sector position, incrementing the current sub-field index to locate the next sub-field, and incrementing the prediction vector bit count, as long as all sub-fields of the FHT entry have not been handled, repeating the setting, outputting, detecting, incrementing operations until instructions in all sectors have been output in the FHT sequence from the same AIC row, setting an end-indicator into the sub-field located by the current sub-field index if the next instruction address of the processor is not equal to any AIC directory sector address for the AIC row to indicate the next AIC sector is not in the AIC row, and ending the generation process for the new FHT entry when the sector position locator indicates all sectors in the AIC row have been serviced, and setting into a next instruction address field in the FHT entry the next instruction address in the processor (for locating the next sector in a different AIC row), and adjusting any replacement control field(s) to indicate the new FHT entry is the most recently used FHT entry in the FHT set, whereby the new FHT entry is not the first FHT entry generated for the associated AIC row.

9. A processor method for reducing branch instruction overhead during program execution by a processor as defined in claim 8, when an AIC miss occurs because no AIC sector is found by the sector-searching operation, the method further comprising:

invalidating any FHT entry having a FHT hit (because the FHT hit may be rendered erroneous for an AIC row having an AIC miss), setting a sector position index S to an initial value, and setting a vector bit count B to an initial value, assigning a new AIC index R for locating a new AIC row and a corresponding new AIC directory entry, and setting the assigned AIC row has an invalid state, in the new FHT entry, storing the next instruction address of the processor into an initial instruction address field, storing the assigned AIC index R into the AIC location field, and storing the sector position index S into the AIC sector position field, fetching consecutive instructions at a current AIC sector address in a memory line in the storage hierarchy, in which fetching starts at the AIC sector address and ends when any branch instruction is encountered or when LT instructions are fetched to fill the sector, while making a count L of the number of instructions fetched for the sector, and detecting if any branch instruction exists in the fetched instructions, storing the fetched instructions into the AIC sector at the sector position index S in the AIC row, and storing NOP characters into any instruction positions in the sector not receiving a fetched instruction, and also sending the fetched instructions to an execution unit of the processor, placing the value S of the current sub-field index into a sub-field located at a current sub-field index in a sector arrangement field in the new FHT entry, storing a no-branch indicator into a sub-field at the current index S in a sectors branches outcomes field in the FHT entry if no branch instruction is detected in the current AIC sector, or storing the state of a prediction vector bit located at a current vector bit count B into the sub-field if a branch instruction is detected in the current AIC sector, incrementing the vector bit count B by one if a branch instruction is stored into the sector, and incrementing the index S in preparation for accessing the next sub-fields in the FHT entry for the next AIC sector in the AIC row as long as all AIC sectors in the AIC row have not been serviced, repeating the fetching, storing, placing, storing and incrementing operations until all sectors have been stored and serviced in the AIC row, then validating the AIC directory entry, in the FHT entry, setting the next instruction address field to the next instruction address of the processor, and setting any replacement indicator field(s) to indicate this FHT entry is the most recently used entry in the FHT set, and validating the FHT entry, and providing the next instruction address of the processor for the prediction for the next FHT cycle.

10. A processor method for reducing branch instruction overhead during program execution by a processor as defined in claim 8, the sector-searching operation further comprising:

delineating a sector number field in the next instruction address by extending the low-order end of the FHT set field by Q number of contiguous bits in the next instruction address, where $2**Q$ is the maximum number of sectors in each AIC row, using the sector number field as an index into a SDT (sector distribution table) to locate a SDT entry associated with the next instruction address, determining the validity of the SDT entry, and if valid accessing in the SDT entry an AIC row field and an AIC sector position field to locate an AIC directory entry and an AIC sector address therein, accessing the AIC sector address in the AIC directory entry, and comparing the accessed AIC directory sector address with the current next instruction address of the processor, an AIC hit being indicated if an equal comparison is obtained, and an AIC miss being indicated if an unequal comparison is obtained.

11. A processor method for reducing branch instruction overhead during program execution by a processor as defined in claim 9, for an AIC miss the AIC index assigning operation further comprising:

hashing the next instruction address in the prediction for the current FHT cycle to perform the assigning operation for the new AIC index R.

12. A processor method for reducing branch instruction overhead during program execution by a processor as defined in claim 8, further comprising:

specifying an address tag field in the current next instruction address as a set of contiguous bits bounded at its low-order end by the high-order end of the memory line address portion of the next instruction address, and the high-order end of the address tag field being at or before the high-order end of the current next instruction address, using the address tag field as a comparand with an address tag field in a SDT entry located by the FHT set field in this current next instruction address.

13. A processor method for reducing branch instruction overhead during program execution by a processor as defined in claim 9, further comprising:

matching the address tag field in a current next instruction address with an address tag field in a SDT entry located by this current next instruction address, and indicating a possible AIC hit if an equal match is obtained and the high-order end of the address tag field in the next instruction address is before the high-order end of the next instruction address, and indicating an AIC miss if no match is obtained, the possible AIC hit being an actual AIC hit if the high-order end of the address tag field is at the high-order end of the current next instruction address.

14. A processor method for reducing branch instruction overhead during program execution by a processor as defined in claim 13, further comprising:

verifying the possible AIC hit-is an actual AIC hit by obtaining an AIC directory sector address at an AIC location and sector position indicated in the SDT entry, and comparing the obtained AIC directory sector address with the current next instruction address of the processor, an AIC hit being indicated if an equal comparison is obtained, and an AIC miss being indicated if an unequal comparison is obtained.

15. A processor method for reducing branch instruction overhead during program execution by a processor as defined in claim 4, further comprising:

delineating a sector number field in the next instruction address by extending the low-order end of the FHT set field by Q number of contiguous bits in the next instruction address, where 2**Q is the maximum number of sectors in each AIC row, using the sector number field as an index into a SDT (sector distribution table) to locate a SDT entry associated with the next instruction address, determining the validity of the SDT entry, and if valid accessing an AIC sector position field, comparing the SD sector position value in the accessed SDT sector position field with the current sector position S, and if the SD sector position value is not greater than a current sector index S, do not invalidate the SDT entry, which is allowed to remain valid because it represents a lower sector position value than the current sector position S and therefore may have a greater probability of being used again than if it is invalidated and made into a new SDT entry for the current sector S, and continuing the generation of the AIC sector at AIC sector position S.

16. A processor method for reducing branch instruction overhead during program execution by a processor as defined in claim 8, for a FHT miss and an AIC hit the process further comprising:

initially setting a sub-field index C to an initial value to locate the current subfield, and incrementing C by one after each sub-field is stored in the arrangement field and the sectors branches outcomes field in the new FHT entry.

17. Processor apparatus for reducing branch instruction overhead during program execution, comprising a fetch history table (FHT) for containing FHT entries that capture branch-taken and branch-not-taken histories of execution sequences of branch instructions occurring during execution of a program, a branch instruction prediction unit (prediction unit) connected to the FHT for indicating sequences of taken and not-taken branch outcomes for corresponding sequences of branch instructions following instruction fetch addresses in the FHT entries that indicate the beginnings of sequences of instructions represented by the FHT entries, an aligned instruction cache (AIC) containing rows of aligned sectors for storing sets of instructions in the program fetched from sector addresses in a computer storage hierarchy, an AIC directory associated with the AIC, the AIC directory containing AIC directory entries with sector positions corresponding to the rows and sectors in he AIC, the AIC directory entries containing entries having sector addresses for locating sectors of instructions in a computer storage hierarchy fetched to corresponding sectors in the AIC rows, FHT entry fields for recording locations of AIC rows and sector positions selected under control of the FHT entries, sector gates connected to the aligned sectors in the AIC rows for outputting the instructions from sectors selected by FHT entries to be sent for execution by the processor apparatus.

18. Processor apparatus for reducing branch instruction overhead as defined in claim 17, further comprising a plurality of comparators respectively connected to outputs of the sector positions of the AIC directory for receiving valid sector addresses in respective sector positions, each comparator also receiving as an input an address currently in an IFAR (instruction fetch address register) for comparison with the sector address received by the respective comparator, and a sector position indicator being provided for outputting a respective sector position value from the comparators when the comparator is actuated by equal inputted addresses.

19. Processor apparatus for reducing branch instruction overhead as defined in claim 17, further comprising a sector distribution table (SDT) connected to the FHT and to the AIC directory for determining if any AIC row contains a sector needed for an instruction sequence being indicated for a FHT entry being generated, each SDT entry in the SDT being associated with and located by a different instruction address, each valid SDT entry in the SDT containing a field indicating an AIC location of an AIC row containing the sector.

20. Processor apparatus for reducing branch instruction overhead as defined in claim 19, further comprising each valid SDT entry also indicating a sector position in the AIC row containing the sector needed for the instruction sequence in the FHT entry being generated.

* * * * *